United States Patent
Dao et al.

(10) Patent No.: US 11,711,858 B2
(45) Date of Patent: *Jul. 25, 2023

(54) SHARED PDU SESSION ESTABLISHMENT AND BINDING

(71) Applicant: HUAWEI TECHNOLOGIES CO., LTD., Shenzhen (CN)

(72) Inventors: Ngoc Dung Dao, Ottawa (CA); Hang Zhang, Nepean (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,919

(22) Filed: Jul. 14, 2022

(65) Prior Publication Data
US 2022/0353928 A1    Nov. 3, 2022

Related U.S. Application Data

(63) Continuation of application No. 16/945,376, filed on Jul. 31, 2020, now Pat. No. 11,412,556, which is a (Continued)

(51) Int. Cl.
*H04W 76/10* (2018.01)
*H04W 4/08* (2009.01)
(Continued)

(52) U.S. Cl.
CPC .............. *H04W 76/10* (2018.02); *H04W 4/08* (2013.01); *H04W 8/186* (2013.01); *H04W 60/00* (2013.01);
(Continued)

(58) Field of Classification Search
CPC ....... H04W 76/10; H04W 4/08; H04W 8/186; H04W 60/00; H04W 8/08; H04W 60/04;
(Continued)

(56) References Cited

U.S. PATENT DOCUMENTS

2015/0288529 A1    10/2015  Kekki et al.
2017/0264606 A1     9/2017  Forssell et al.
(Continued)

FOREIGN PATENT DOCUMENTS

CN       101176330 A       5/2008
CN       102377803 A       3/2012
(Continued)

OTHER PUBLICATIONS

"System Architecture for the 5G System; Stage 2"; 3GPP TS 23.501 V1.4.0 (Sep. 2017).
(Continued)

*Primary Examiner* — Ashley Shivers

(57) ABSTRACT

A network function and a method for associating a UE of a UE group to a PDU session with in a CN. The NF establishes a shared PDU session for the UE group before all of the UEs in the UE group register with the CN and binds a UE that has not yet registered with the CN to the shared PDU session when the UE registers with the CN, provided the UE will share at least one of a UL UP connection and a DL UP connection associated with the shared PDU session. The NF may be an SMF.

18 Claims, 16 Drawing Sheets

Related U.S. Application Data continuation of application No. 16/210,216, filed on Dec. 5, 2018, now Pat. No. 10,736,155.

(60) Provisional application No. 62/599,306, filed on Dec. 15, 2017.

(51) Int. Cl.
*H04W 8/18* (2009.01)
*H04W 60/00* (2009.01)
*H04W 8/08* (2009.01)
*H04W 60/06* (2009.01)
*H04W 60/04* (2009.01)

(52) U.S. Cl.
CPC .............. *H04W 8/08* (2013.01); *H04W 60/04* (2013.01); *H04W 60/06* (2013.01)

(58) Field of Classification Search
CPC ..... H04W 60/06; H04W 76/11; H04W 76/12; H04W 76/22
See application file for complete search history.

(56) References Cited

U.S. PATENT DOCUMENTS

| | | |
|---|---|---|
| 2017/0303259 A1 | 10/2017 | Lee et al. |
| 2017/0332421 A1 | 11/2017 | Sternberg et al. |
| 2018/0041424 A1 | 2/2018 | Zhang |
| 2018/0041425 A1 | 2/2018 | Zhang |
| 2018/0041435 A1 | 2/2018 | Zhang |
| 2019/0075431 A1* | 3/2019 | Albasheir ............... H04L 67/52 |
| 2019/0150219 A1 | 5/2019 | Wang et al. |
| 2019/0159157 A1 | 5/2019 | Gupta |
| 2019/0274178 A1* | 9/2019 | Salkintzis ............. H04W 12/03 |

FOREIGN PATENT DOCUMENTS

| | | |
|---|---|---|
| CN | 103460786 A | 12/2013 |
| CN | 104770015 A | 7/2015 |
| CN | 105704197 A | 6/2016 |
| CN | 105874832 A | 8/2016 |
| CN | 105917689 A | 8/2016 |
| CN | 106576242 A | 4/2017 |
| WO | 2012050368 A2 | 4/2012 |

OTHER PUBLICATIONS

"Procedures for the 5G System; Stage 2"; 3GPP TS 23.502 V1.2.0 (Sep. 2017).

SA WG2 Meeting #124, S2-178856, Ericsson:"Cleanup of Network Exposure", Nov. 27-Dec. 1, 2017, Reno, Nevada (USA). 19 pages.

3GPP TS 23.501 V1.6.0 (Dec. 2017), 3rd Generation Partnership Project;Technical Specification Group Services and System Aspects; System Architecture for the 5G System; Stage 2 (Release 15), 184 pages.

Nokia, Alcatel-Lucent Shanghai Bell, Update on PCF Selection. SA WG2 Meeting #122, Jun. 26-30, 2017, San Jose Del Cabo, Mexico, S2-174255, 4 pages.

China Mobile, Deutsche Telekom, Verizon, 23.502: discovering the PCF requested by AF using BSF service, SA WG2 Meeting # SA WG2 Meeting #124, Nov. 27-Dec. 1, 2017, Reno, Nevada, USA, S2-179628, 4 pages.

Huawei, Hisilicon, Update to Solution 15: Management of PDU Sessions and UP paths, 3GPP TSG-SA WG2 Meeting #129, Dongguan, China, Oct. 15-Oct. 19, 2018, S2-1810786, 3 pages.

* cited by examiner

SHARED PDU SESSION ESTABLISHMENT AND BINDING

RELATED APPLICATIONS

This application is a continuation of U.S. patent application Ser. No. 16/945,376, filed on Jul. 13, 2020, which is continuation of U.S. patent application Ser. No. 16/210,216 filed on Dec. 5, 2018, which claims the benefit and priority of, U.S. Patent Application No. 62/599,306 entitled "Shared PDU Session Establishment and Binding" filed 15 Dec. 2017, the entire contents of which are incorporated by reference, inclusive of all filed references and appendices.

TECHNICAL FIELD

The present disclosure relates to wireless communications and particular embodiments or aspects relate to packet data unit (PDU) session management.

BACKGROUND

In modern wireless communications systems, including without limitation, 3G, 4G and 5G systems, when it is desired to send or receive data to or from a user equipment (UE) 1252 (FIG. 12), which may be an electronic device 52 (FIG. 1), a PDU session is created or registered by a core network (CN) 114 (FIG. 4) to which the UE 1252 will be bound. In creating the PDU session, a control plane (CP) 108 function (CPF), such as a session management function (SMF) 92 (FIG. 2) in a 5G CN 114, sends a user plane (UP) configuration to a radio access node ((R)AN) node 84 (FIG. 2) and to a UP function (UPF) 86 (FIG. 2) associated with the UE 1252. The CN 114 may also assign one or more internet protocol (IP) addresses and/or IP prefixes for use by the UE 1252 within the PDU session.

The CN 114 performs additional procedures in order to maintain the UP connections as the UE 1252 moves about the geographical space supported by the CN 114. As a result, there may be a considerable signalling overhead between the UE 1252 and the CN 114 associated with the registration of the PDU session and the binding of the UE 1252 thereto.

For many types of UE 1252, the signalling overhead is acceptable given the amount of communication traffic exchanged along the wireless communications network between the UE 1252 and the UPF(s) 86.

However, increasingly, UEs 1252 are being used as Internet of Things (IoT) devices. The IoT is a term applied to a loose network of physical devices, including without limitation, vehicles, home appliances and other items, that are embedded with electronics, software, sensors, actuators and network connectivity to enable such objects to connect and exchange data within the existing internet infrastructure. IoT devices are generally characterized by infrequent and simple communications. Early IoT devices were relatively immobile, and connected through wireline and WiFi networks. Increasingly, IoT devices are becoming mobile and access wireless communications networks. Such IoT devices may be known as cellular IoT (CIoT) devices.

In addition to being characterized by infrequent and simple communications, it is expected that the number of CIoT devices will explode. Moreover, it is expected that by their nature, CIoT devices will have very limited power resources.

Thus, as CIoT devices proliferate, the conventional view that a separate PDU session is created for and bound to a single UE 1252 may no longer be appropriate due to the number of UEs 1252 acting as CIoT devices and the infrequent communications involving a given device. Rather, the cost of managing CIoT devices in such a fashion may exceed the cost of data transmission involving such CIoT devices.

A number of approaches have been proposed to reduce the signalling overhead associated with the session management of UEs 1252 acting as CIoT devices. One such approach is disclosed in commonly titled patent applications "Hop-on device traffic delivery": Ser. No. 15/440,749, 15/440,779, and 15/440,950 by Zhang, Hang. In the Zhang approach, a pre-configured UP connection is pre-established among UP network functions (NFs) so that, when a UE intends to send an uplink (UL) packet to a UPF 86, the UP is already configured. The concept is not dissimilar to the "hop-on" tourist bus ride service, in which the bus follows a pre-determined route and users purchase a pass for a period of time that permits unlimited use of the bus service by "hopping on" to the bus at any location along the route and "hopping off" the bus at any location at any time within the period for which a pass has been purchased.

While the Zhang approach is described in general, the mechanism by which session management may be implemented is not discussed.

Accordingly, there may be a need for a mechanism to register a, and bind a UE 1252 to an existing, shared PDU session that is not subject to one or more limitations of the prior art.

This background is intended to provide information that may be of possible relevance to the present invention. No admission is necessarily intended, nor should be construed, that any of the preceding information constitutes prior art against the present invention.

SUMMARY

It is an object of the present disclosure to obviate or mitigate at least one disadvantage of the prior art.

According to a first broad aspect of the present disclosure, there is disclosed an NF comprising: a processor; a non-transient memory for storing instructions that when executed by the processor cause the NF to be configured to: establish a shared PDU session within a CN of a UE group before all the UEs in the UE group register with the CN; and bind a UE that has not yet registered with the CN to the shared PDU session when the UE registers with the CN, provided the UE will share at least one of a UL UP connection and a DL UP connection associated with the shared PDU session.

In an embodiment, the NF can be an SMF. In an embodiment, the shared PDU session can have a shared PDU session identifier associated therewith. In an embodiment, the shared PDU session identifier can be generated by at least one of a UDM function, one of the UEs in the UE group, the NF and an AMF. In an embodiment, the NF is a session management function (SMF). In an embodiment, the shared PDU session identifier can be sent to an AMF. In an embodiment, the shared PDU session identifier can be a newly created PDU session that is converted into a shared PDU session. In an embodiment, the memory can comprise instructions to cause the NF to inform an AMF that the newly created PDU session is to be converted into a shared PDU session.

In an embodiment, the UEs in the UE group can have a common UE device class. In an embodiment, the UEs in the UE group can be distinguished by a UE group identifier.

In an embodiment, the memory can comprise instructions to cause the NF to establish by creating a shared tunnel for the shared PDU session having a shared UL TEID and a shared DL TEDI describing respective endpoints thereof and communicating it to a (R)AN node and a UPF associated with the UEs of the UE group. In an embodiment, the memory can comprise instructions to cause the NF to identify the shared UL TEID and provide it to the (R)AN node and UPF. In an embodiment, the memory can comprise instructions to cause the NF to obtain the shared DL TEID from the (R)AN node and provide it to the UPF.

In an embodiment, the memory can comprise instructions to cause the NF to bind by requesting the (R)AN node to assign a DRB to the UE.

In an embodiment, the memory can comprise instructions to cause the NF to bind by requesting the (R)AN node associated with the UE to send a UL packet at the shared UL TEID to the UPF associated with the UE that includes the shared DL TEID under direction of the NF.

In an embodiment, the memory can comprise instructions to cause the NF to bind by requesting an AMF to request a UE context to be established for the UE from the (R)AN node associated with the UE and providing the UE context to the NF. In an embodiment, the memory can comprise instructions to cause the NF to bind by forwarding the UE context to the UPF associated with the UE.

In an embodiment, the memory can comprise instructions to cause the NF to bind by sending a shared PDU session binding request to the (R)AN node associated with the UE and to the UPF associated with the UE.

In an embodiment, the memory can comprise instructions to cause the NF to bind by determining whether the UE will share either or both of the UL UP connection and the DL UP connection associated with the shared PDU session. In an embodiment, the NF can determine whether the UE will share either or both of the UL UP connection and DL UP connection associated with the shared PDU session based on mobility information of the UE.

In an embodiment, the memory can comprise instructions to cause the NF to bind by requesting the (R)AN node to generate a unique DL TEID for use by the UE if the UE will not share the DL UP connection associated with the shared PDU session. In an embodiment, the memory can comprise instructions to cause the NF to assign information associated with an IP tunnel along a link coupling a UPF and a DN to carry UL packets therealong. In an embodiment, the information can be at least one of an IP address and an IP prefix for the IP tunnel.

In an embodiment, the memory can comprise instructions to cause the NF to bind by generating a unique UL TEID for use by the UE if the UE will not share the UL UP connection associated with the shared PDU session. In an embodiment, the unique UL TEID can be generated by the NF. In an embodiment, the unique UL TEID can be generated by the UPF.

According to a second broad aspect of the present disclosure, there is disclosed a method for associating a UE of a UE group to a PDU session within a CN, comprising actions at an SMF of: establishing a shared PDU session for the UE group before all of the UEs in the UE group register with the CN; and binding a UE that has not yet registered with the CN to the shared PDU session when the UE registers with the CN, provided the UE will share at least one of a UL UP connection and a DL UP connection associated with the shared PDU session.

According to a third broad aspect of the present disclosure, there is disclosed an NF comprising: a processor; a non-transient memory for storing instructions that when executed by the NF to be configured to: receive a request to create an access and mobility context for establishing a shared PDU session within a CN of a UE group before all of the UEs in the UE group register with the CN; obtain information related to the UE group from a CPF in the network; and send a request to an SMF in the network to establish the shared PDU session using the information related to the UE group, whereby the SMF may thereafter bind a UE that has not yet registered with the CN to the shared PDU session when the UE registers with the CN, provided the UE will share at least one of a UL UP connection and a DL UP connection associated with the shared PDU session.

In an embodiment, the NF is an AMF. In an embodiment, when the UE registers with the CN, an AMF other than the NF can be selected to serve the UE and the AMF can obtain information related to the UE group and to the NF from the CPF so that the NF can replace the AMF to serve the UE while the UE is bound to the shared PDU session.

In an embodiment, the information can be a policy of the UE group and the CPF can be a PCF. In an embodiment, the information can be subscription data related to the UE and the CPF can be a UDM function.

According to a fourth broad aspect of the present disclosure, there is disclosed a method for associating a UE of a UE group to a PDU session within a CN, comprising actions at an AMF of: receiving a request to create an access and mobility context for establishing a shared PDU session within the CN of the UE group before all of the UEs in the UE group register with the CN; obtaining information related to the UE group from a CPF in the network; and sending a request to an SMF in the network to establish the shared PDU session using the information related to the UE group, whereby the SMF may thereafter bind a UE that has not yet registered with the CN to the shared PDU session when the UE registers with the CN, provided the UE will share at least one of a UL UP connection and a DL UP connection associated with the shared PDU session.

Embodiments have been described above in conjunction with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present disclosure may provide a method and a network function for associating a UE of a UE group to a PDU session within a CN.

BRIEF DESCRIPTION OF THE DRAWINGS

Example embodiments of the present disclosure will now be described by reference to the following figures, in which identical reference numerals in different figures indicate identical elements and in which.

Figure 1:
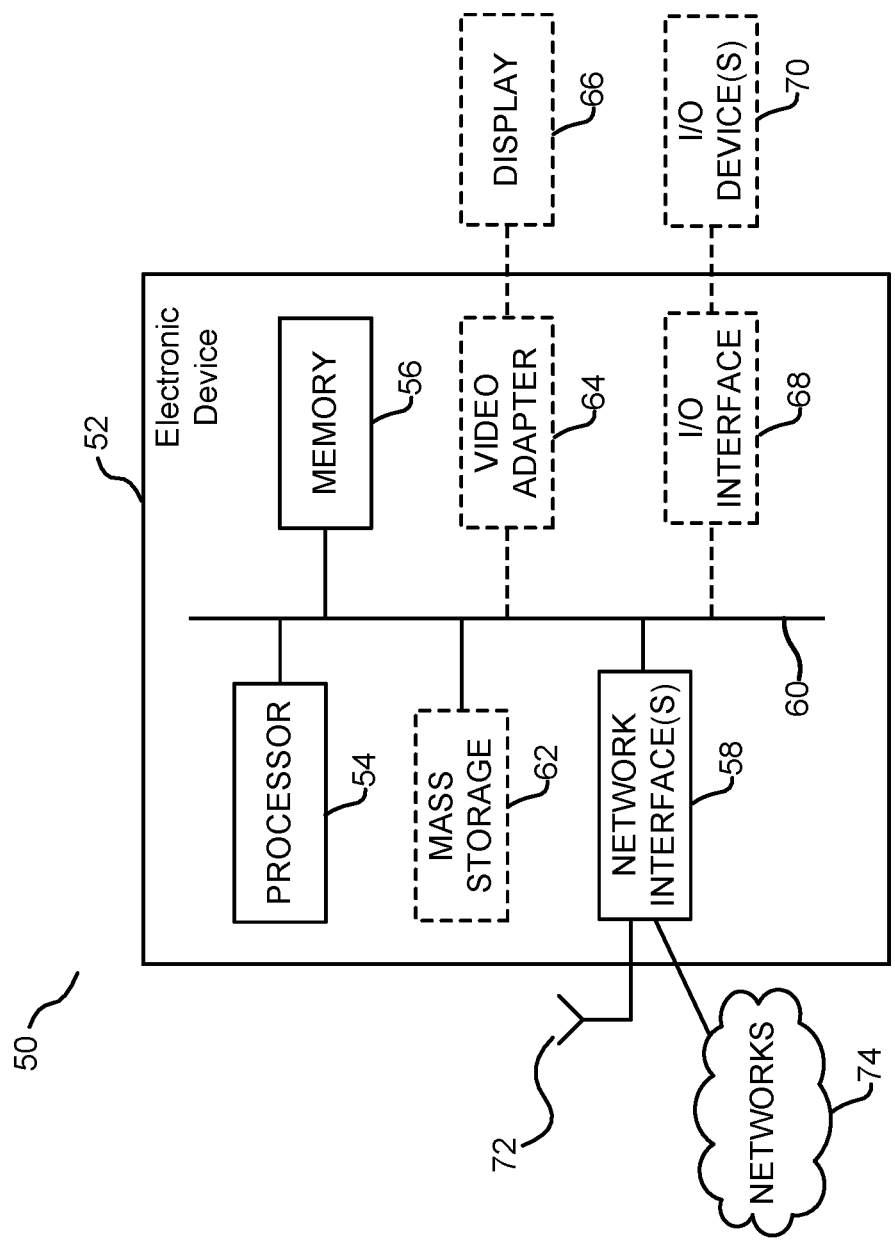
FIG. 1 is a block diagram of an electronic device within a computing and communications environment 50 that may be used for implementing devices and methods in accordance with representative embodiments of the present disclosure.

In the present disclosure, for purposes of explanation and not limitation, specific details are set forth in order to provide a thorough understanding of the present disclosure. In some instances, detailed descriptions of well-known devices, circuits and methods are omitted so as not to obscure the description of the present disclosure with unnecessary detail.

Accordingly, the system and method components have been represented where appropriate by conventional symbols in the drawings, showing only those specific details that are pertinent to understanding the embodiments of the present disclosure, so as not to obscure the disclosure with details that will be readily apparent to those of ordinary skill in the art having the benefit of the description herein.

Any feature or action shown in dashed outline may in some example embodiments be considered as optional.

DESCRIPTION

FIG. 1 is a block diagram of an electronic device (ED) 52 illustrated within a computing and communications environment 50 that may be used for implementing the devices and methods disclosed herein. In some embodiments, the ED 52 may be an element of communications network infrastructure, such as a base station (for example a NodeB, an evolved Node B (eNodeB or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or Public Land Mobility Network (PLMN). In other embodiments, the ED 52 may be device that connects to the network infrastructure over a radio interface, such as a mobile phone, smart phone or other such device that may be classified as a User Equipment (UE). In some embodiments, the ED 52 may be a Machine Type Communications (MTC) device (also referred to as a machine-to-machine (m2m) device), or another such device that may be categorized as a UE despite not providing a direct service to a user. In some references, an ED 52 may also be referred to as a mobile device, a term intended to reflect devices that connect to a mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The ED 52 typically includes a processor 54, such as a Central Processing Unit (CPU) and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed outline).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The ED 52 may also include one or more network interfaces 58, which may include at least one of wired network interface and a wireless network interface. As illustrated in FIG. 1, a network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (e.g. an eNB). When ED 52 is infrastructure at the radio edge of a network 74, both wired and wireless network interfaces may be included. When ED 52 is a wirelessly connected device, such as a UE, radio access network interface 72 may be present and it may be supplemented by other wireless interfaces such as WiFi network interfaces. The network interfaces 58 allow the ED 52 to communicate with remote entities such as those connected to network 74.

The mass storage 62 may comprise any type of non-transitory storage device configured to store data, programs and other information and to make the data, programs and other information accessible via the bus 60. The mass storage 62 may comprise, for example, one or more of a solid-state drive, hard disk drive, a magnetic disk drive or an optical disk drive. In some embodiments, mass storage 62 may be remote to ED 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed outline) provide interface to couple the ED 52 to external input and output devices. Examples of input and output devices include a display 66 coupled to the video adapter 64 and an I/O device 70 such as a touch-screen coupled to the I/O interface 68. Other devices may be coupled to the ED 52, and additional or fewer interfaces may be utilized. For example, a serial interface such as a Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, ED 52 may be a stand-alone device, while in other embodiments ED 52 may be resident within a data center. A data center, as will be understood in the art, is a collection of computing resources (typically in the form of services) that can be used as a collective computing and storage resource. Within a data center, a plurality of services can be connected together to provide a computing resource pool upon which virtualized entities can be instantiated. Data centers can be interconnected with each other to form networks consisting of pooled computing and storage resources connected to each other by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network 74) can be divided between different sub-networks, in some cases in the form of a resource slice. If the resources across a number of connected data centers or other collection of nodes are sliced, different network slices can be created.

Figure 2:
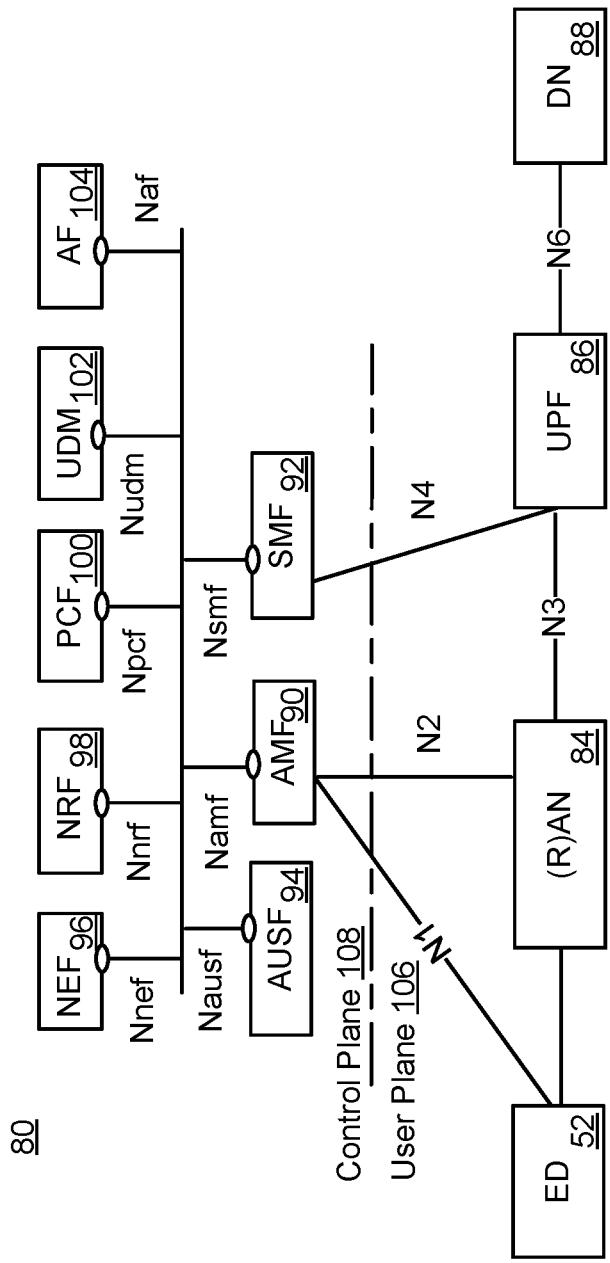
FIG. 2 is a block diagram illustrating a service-based view of a system architecture of a 5G Core Network.

FIG. 2 illustrates a service-based architecture 80 for a 5G or Next generation Core Network (5GCN/NGCN/NCN). This illustration depicts logical connections between nodes and functions, and its illustrated connections should not be interpreted as direct physical connection. ED 50 forms a radio access network connection with a (Radio) Access Network node (R)AN 84, which is connected to a User Plane (UP) Function (UPF) 86 such as a UP Gateway of a network interface such as an N3 interface. UPF 86 connected to a Data Network (DN) 88 over a network interface such as an N6 interface. DN 88 may be a data network used to provide an operator service, or it may be outside the scope of the standardization of the Third Generation Partnership Project (3GPP), such as the Internet, a network used to provide third party service, and in some embodiments DN 88 may represent an Edge Computing network or resources, such as a Mobile Edge Computing (MEC) network. ED 52 also connects to the Access and Mobility Management Function (AMF) 90. The AMF 90 is responsible for authentication and authorization of access requests, as well as mobility management functions. The AMF 90 may perform other roles and functions as defined by the 3GPP Technical Specification (TS) 23.501. In a service-based view, AMF 90 can communicate with other functions through a service-based interface denoted as Namf. The Session Management Function (SMF) 92 is an NF that is responsible for the allocation and management of IP addresses that are assigned to a UE as well as the selection of a UPF 86 (or a particular instance of a UPF 86) for traffic associated with a particular session of ED 52. The SMF 92 can communicate with other functions, in a service-based view, through a service-based interface denoted as Nsmf. The Authentication Server function (AUSF) 94 provides authentication services to other NFs over a service-based Nausf interface. A Network Exposure Function (NEF) 96 can be deployed in the network to allow servers, functions and other entities such as those outside a trusted domain to have exposure to services and capabilities within the network. In one such example, the NEF 96 can act much like a proxy between an application server outside the illustrated network and NFs such as the Policy Control Function (PCF) 100, the SMF 92 and the AMF 90, so that the external application server can provide information that may be of use in the setup of the parameters associated with a data session. The NEF 96 can communicate with other NFs through a service-based Nnef network interface. The NEF 96 may also have an interface to non-3GPP functions. A Network Repository Function (NRF) 98, provides network service discovery functionality. The NRF 98 may be specific to the PLMN or network operator, with which it is associated. The service discovery functionality can allow NFs and UEs connected to the network to determine where and how to access existing NFs, and may present the service-based interface Nnrf. PCF 100 communicates with other NFs over a service-based Npcf interface, and can be used to provide policy and rules to other NFs, including those within the control plane (CP) 108. Enforcement and application of the policies and rules is not necessarily the responsibility of the PCF 100, and is instead typically the responsibility of the functions to which the PCF 100 transmits the policy. In one such example the PCF 100 may transmit policy associated with session management to the SMF 92. This may be used to allow for a unified policy framework with which network behaviour can be governed. A Unified Data Management Function (UDM) 102 can present a service based Nudm interface to communicate with other NFs, and can provide data storage facilities to other NFs. Unified data storage can allow for a consolidated view of network information that can be used to ensure that the most relevant information can be made available to different NFs from a single resource. This can make implementation of other NFs easier, as they do not need to determine where a particular type of data is stored in the network. The UDM 102 may employ an interface, such as Nudr to connect to a User Data Repository (UDR). The PCF 100 may be associated with the UDM 102 because it may be involved with requesting and providing subscription policy information to the UDR, but it should be understood that typically the PCF 100 and the UDM 102 are independent functions.

The PCF 100 may have a direct interface to the UDR or can use the Nudr interface to connect with the UDR. The UDM 102 can receive requests to retrieve content stored in the UDR, or requests to store content in the UDR. The UDM 102 is typically responsible for functionality such as the processing of credentials, location management and subscription management. The UDR may also support any or all of authentication credential processing, user identification handling, access authorization, registration/mobility management, subscription management and Short Message Service (SMS) management. The UDR is typically responsible for storing data provided by the UDM 102. The stored data is typically associated with policy profile information (which may be provided by PCF 100) that governs the access rights to the stored data. In some embodiments, the UDR may store policy data, as well as user subscription data, which may include any or all of subscription identifiers, security credentials, access and mobility related subscription data and session related data.

Application Function (AF) 104 represents the non-data plane also referred to as the non-user plane) functionality of an application deployed within a network operator domain and within a 3GPP-compliant network. The AF 104 interacts with other core NFs through a service-based Naf interface, and may access network capability exposure information, as well as provide application information for use in decisions such as traffic routing. The AF 104 can also interact with functions such as the PCF 100 to provide application-specific input into policy and policy enforcement decisions. It should be understood that in many situations the AF 104 does not provide network services to other NFs, and instead is often viewed as consumer or user of services provided by other NFs. An application outside the 3GPP network can perform many of the same functions as AF 104 through the use of NEF 96.

ED 52 communicates with NFs that are in the UP 106, and the CP 108. The UPF 86 is a part of the CN UP 106 (DN 88 being outside the 5GCN). (R)AN 84 may be considered as a part of a UP, but because it is not strictly a part of the CN, it is not considered to be a part of the CN UP 106. AMF 90, SMF 92, AUSF 94, NEF 96, NRF 98, PCF 100 and UDM 102 are functions that reside within the CN CP 108, and are often referred to as CP Functions (CPFs). AF 104 may communicate with other functions within CN CP 108 (either directly or indirectly through the NEF 96), but is typically not considered to be a part of the CN CP 108.

Those skilled in the art will appreciate that there may be a plurality of UPFs 86 connected in series between the (R)AN 84 and the DN 88, and as will be discussed with respect to FIG. 3, multiple data sessions to different DNs can be accommodated through the use of multiple UPFs in parallel.

Figure 3:
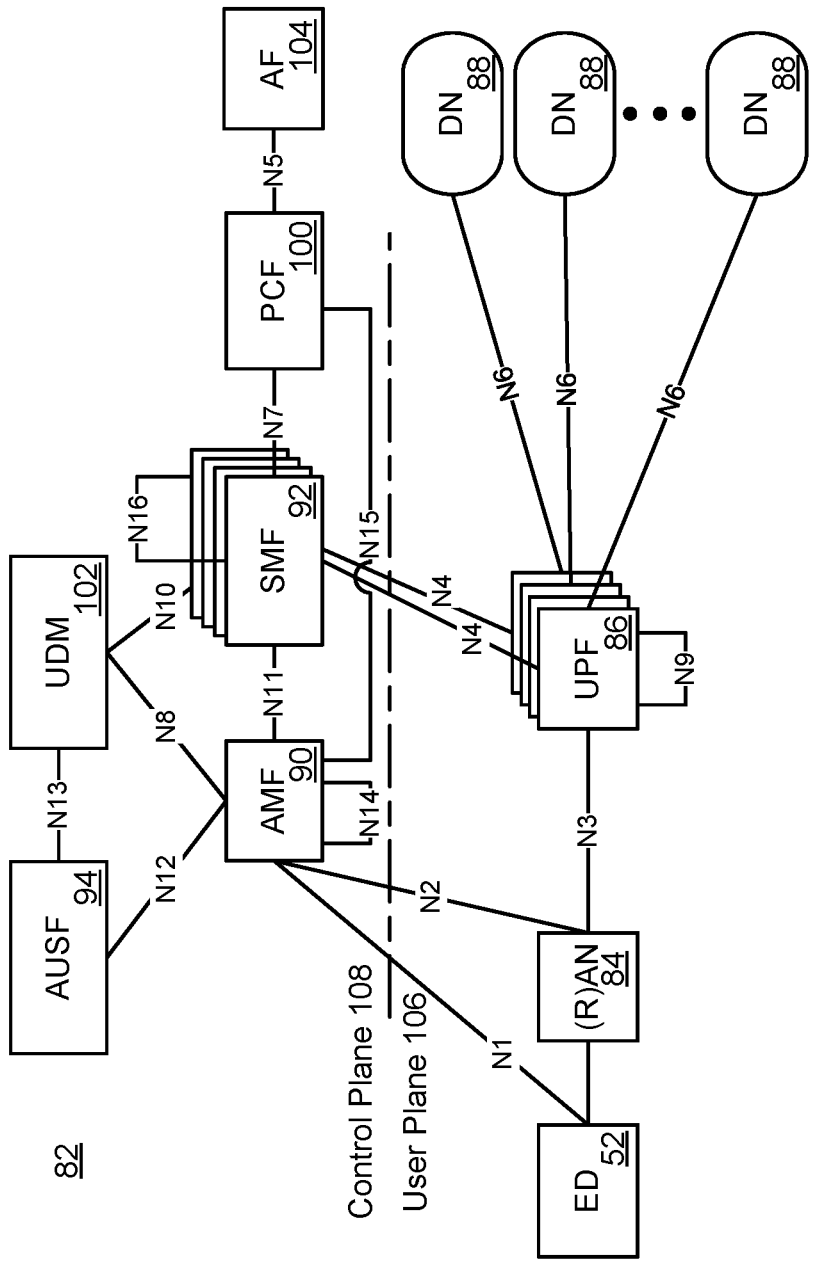
FIG. 3 is a block diagram illustrating the system architecture of a 5G Core network as shown in FIG. 2 from the perspective of reference point connectivity.

FIG. 3 illustrates a reference point representation of a 5GCN architecture 82. For the sake of clarify, some of the NFs illustrated in FIG. 2 are omitted from this figure, but it should be understood that the omitted functions and those not illustrated in either FIG. 2 or FIG. 3) can interact with the illustrated functions.

ED 52 connects to both (R)AN 84 (in the UP 106) and AMF 90 (in the CP 108). The ED-to-AMF connection is an N1 connection. (R)AN 84 also connects to the AMF 90, and does so over an N2 connection. The (R)AN 84 connects to a UPF function 86 of an N3 connection. The UPF 86 is associated with a PDU session, and connects to the SMF 92 over an N4 interface to receive session control information. If the ED 52 has multiple PDU sessions active, they can be supported by multiple different UPFs 86, each of which is connected to an SMF 92 over an N4 interface. It should be understood that from the perspective of reference point representation, multiple instances of either an SMF 92 or an UPF 86 are considered as distinct entities. The UPFs 86 each connect to a DN 88 outside the 5GCN over an N6 interface. SMF 92 connects to the PCF 100 over an N7 interface, while the PCF 100 connects to an AF 104 over an N5 interface. The AMF 90 connects to the UDM 102 over an N8 interface. If two UPFs 86 in UP 106 connect to each other, they can do so over an N9 interface. The UDM 102 can connect to an SMF 92 over an N10 interface. The AMF 90 and SMF 92 connect to each other over an N11 interface. An N12 interface connects the AUSF 94 to the AMF 90. The AUSF 94 can connect to the UDM 102 over an N13 interface. In networks in which there is a plurality of AMFs 90, they can connect to each other over an N14 interface. The PCF 100 can connect to an AMF 90 over the N15 interface. If there is a plurality of SMFs 92 in the network, they can communicate with each other over an N16 interface.

It should also be understood that any or all of the functions and nodes, discussed above with respect to the architectures 80 and 82 of the 5GCN, may be virtualized within a network, and the network itself may be provided as network slice of a larger resource pool, as will be discussed below.

Figure 4:
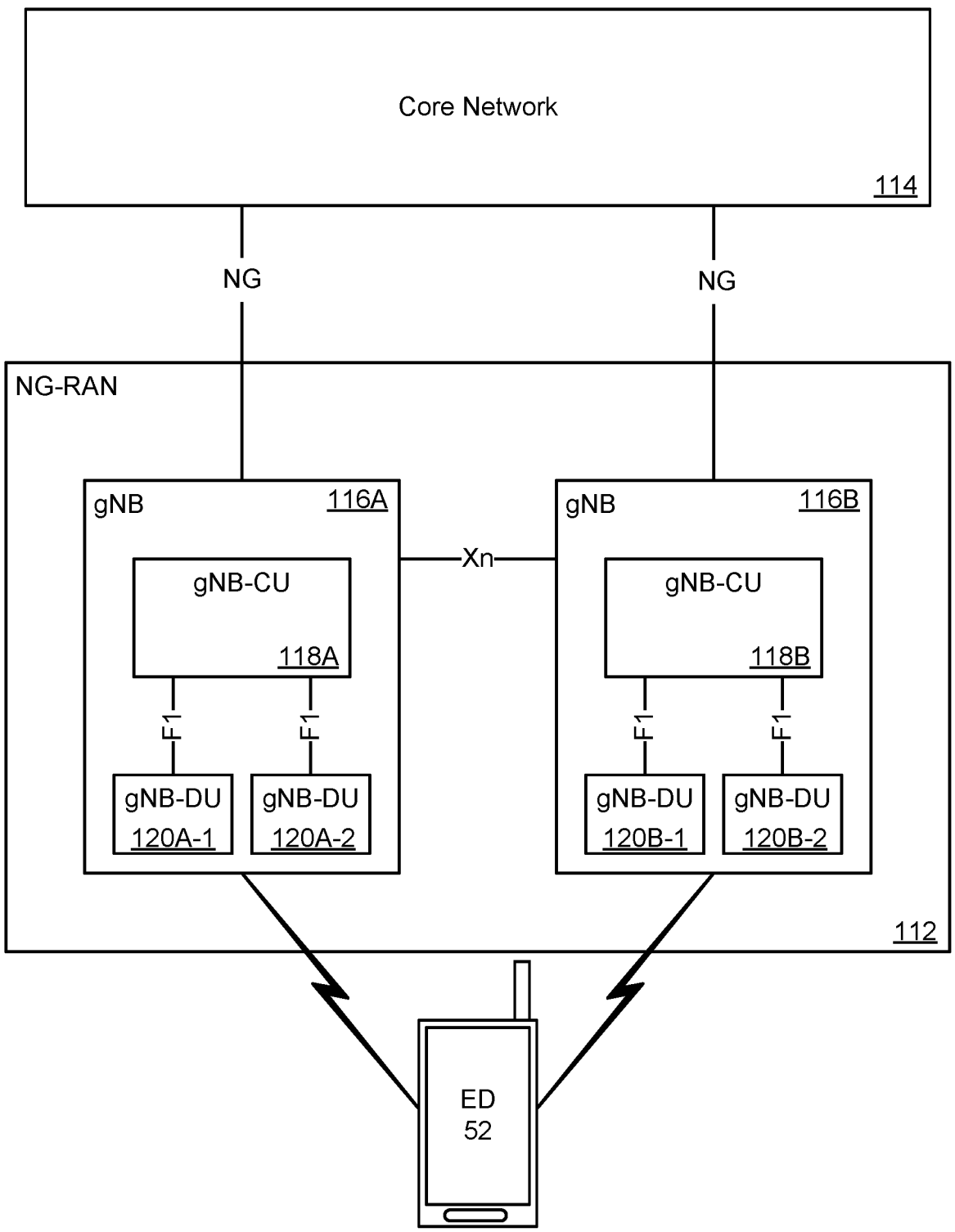
FIG. 4 is a block diagram illustrating an architecture of a 5G Radio Access network architecture.

FIG. 4 illustrates a proposed architecture 110 for the implementation of a Next Generation Radio Access network (NG-RAN) 112, also referred to as a 5G RAN. NG-RAN 112 is the radio access network that connects an ED 52 to a CN 114. Those skilled in the art will appreciate that CN 114 may be the 5GCN (as illustrated in FIG. 2 and FIG. 3). In other embodiments, the CN 114 may be a 4G Evolved Packet Core (EPC) network. Nodes with NG-RAN 112 connect to the 5G CN 114 over an NG interface. This NG interface can comprise both the N2 interface to a CP 108 and an N3 interface to a UPF 86 as illustrated in FIG. 2 and FIG. 3. The N3 interface can provide a connection to a CN UPF. NG-RAN 112 includes a plurality of radio access nodes that can be referred to as a gNB. In the NG-RAN 112, gNB 116A and gNB 116B are able to communicate with each other over an Xn interface. Within a single gNB 116A, the functionality of the gNB may be decomposed into a Centralized Unit (gNB-CU) 118A and a set of distributed units (gNB-DU 120A-1 and gNB-DU 120A-2, collectively referred to as 120A). gNB-CU 118A is connected to a gNB-DU 120A over an F1 interface. Similarly gNB 116B has a gNB-CU 118B connecting to a set of distributed units gNB-DU 120B-1 and gNB-DU 120B-2, collectively referred to as 120B). Each gNB DU may be responsible for one or more cells providing radio coverage within the PLMN.

The division of responsibilities between the gNB-CU and the gNB-DU has not been fully defined at this time. Different functions, such as the radio resource management functionality may be placed in one of the CU and the DU. As with all functional placements, there may be advantages and disadvantages to placement of a particular NF in one or the other location. It should also be understood that any or all of the functions discussed above with respect to the NG-RAN 112 may be virtualized within a network, and the network itself may be provided as network slice of a larger resource pool, as will be discussed below.

Figure 5:
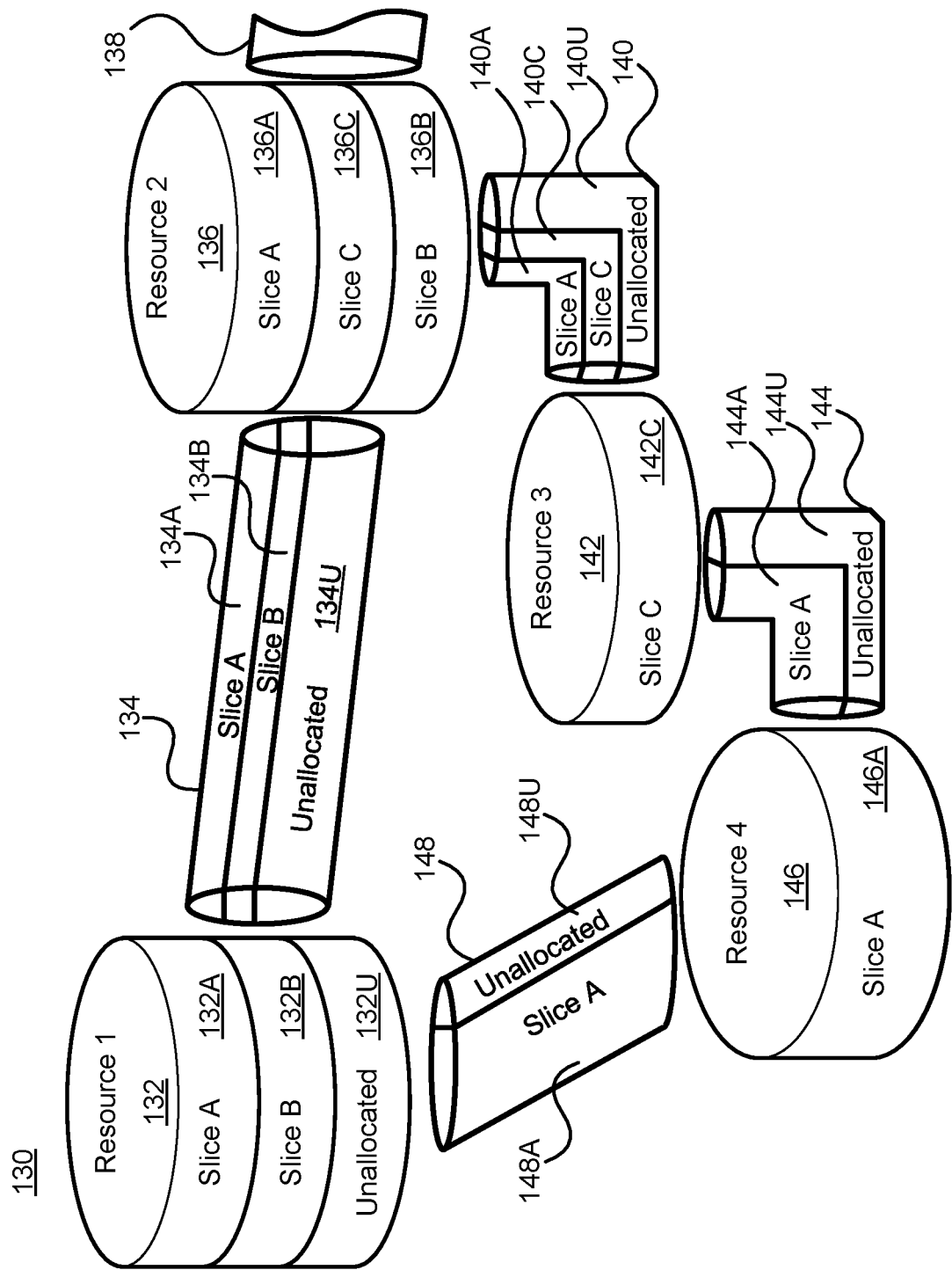
FIG. 5 is a block diagram schematically illustrating an architecture in which network slicing can be implemented.

FIG. 5 illustrates an architecture 130 that connects a plurality of connectivity, compute and storage resources, and supports network slicing. In the following, resources are connected to other discrete resources through Connectivity Resources 134, 138, 140, 144 and 148. It will be understood that as NFs are instantiated within resources, they may be connected to each other by virtual connections that in some embodiments do not rely upon the physical connectivity resources illustrated, but instead may be connected to each other by virtual connections, which will also be considered as connectivity resources. Resource 1 132 is connected to Resource 2 136 by Connectivity Resource 134. Resource 2 136 is connected to unillustrated resources through Connectivity Resource 138, and is also connected to Resource 3 142 by Connectivity Resource 140, and Resource 1 132 is connected to Resource 4 146 by Connectivity Resource 148. Resource 1 132, Resource 2 136, Resource 3 142 and Resource 4 146 should be understood as representing both compute and storage resources, although specialized functions may also be included. In some embodiments, a specialized NF may be represented by any or all of Resource 1 132, Resource 2 136, Resource 3 142 and Resource 4 146, in which case, it may be the capability or capacity of the NF that is being sliced. Connectivity Resources 134, 138, 140, 144 and 148 may be considered, for the following discussions, as logical links between two points (e.g. between two data centers) and may be based on a set of physical connections.

Resource 1 132 is partitioned to allocate resources to Slice A 132A, and Slice B 132B. A portion 132U of the resources available to Resource 1 132 remains unallocated. Those skilled in the art will appreciate that upon allocation of the network resources to different slices, the allocated resources are isolated from each other. This isolation, both in the compute and storage resources, ensures that processes in one slice do not interact or interfere with the processes and functions of the other slices. This isolation can be extended to the connectivity resources as well. Connectivity Resource 134 is partitioned to provide connectivity to Slice A 134A and Slice B 134B, and also retains some unallocated bandwidth 134U. it should be understood that in any resource that either has unallocated resources or that has been partitioned to support a plurality of resources, the amount of the resource (e.g. the allocated bandwidth, memory, or number of processor cycles) can be varied or adjusted to allow changes to the capacity of each slice. In some embodiments, slices are able to support "breathing", which allows the resources allocated to the slice to increase and decrease along with any of the available resources, the required resources, anticipated resource need, or other such factors, alone or in combination with each other. In some embodiments, the allocation of resources may be in the form of soft slices in which a fixed allocation is not committed and instead the amount of the resource provided may be flexible. In some embodiments, a soft allocation may allocate a percentage of the resource to be provided over a given time window, for example 50% of the bandwidth of a connection over a time window. This may be accompanied by a minimum guaranteed allocation. Receiving a guarantee of 50% of the capacity of a connectivity resource at all times may provide very different service characteristics than receiving 50% of the capacity of the connectivity resource over a ten second window.

Resource 2 136 is partitioned to support allocations of the available compute and storage resources to Slice A 136A, Slice C 136C and Slice B 136B. Because there is no allocation of resources in connectivity resource 134 to Slice C, Resource 2 136 may, in some embodiments, not provide a network interface to Slice C 136C to interact with connectivity resource 134. Resource 2 136 can provide an interface to different slices to Connectivity Resource 138 in accordance with the slices supported by Connectivity Resource 138. Connectivity Resource 140 is allocated to Slice A 140A and Slice C 140C with some unallocated capacity 140U. Connectivity Resource 140 connects Resource 2 136 with Resource 3 142.

Resource 3 142 provides compute and storage resources that are allocated exclusively to Slice C 142C, and is also connected to Connectivity Resource 144 which in addition to the unallocated portion 144U includes an allocation of Connectivity Resource 144A to slice A. it should be noted that from the perspective of functions or processes within Slice A, Resource 3 142 may not be visible. Connectivity Resource 144 provides a connection between Resource 3 142 and Resource 4 146, whose resources are allocated entirely to Slice A 146.

Resource 4 146 is connected to Resource 1 132 by Connectivity Resource 148, which has a portion of the connection allocated to Slice A 148, while the balance of the resources 148U are unallocated.

Figure 6:
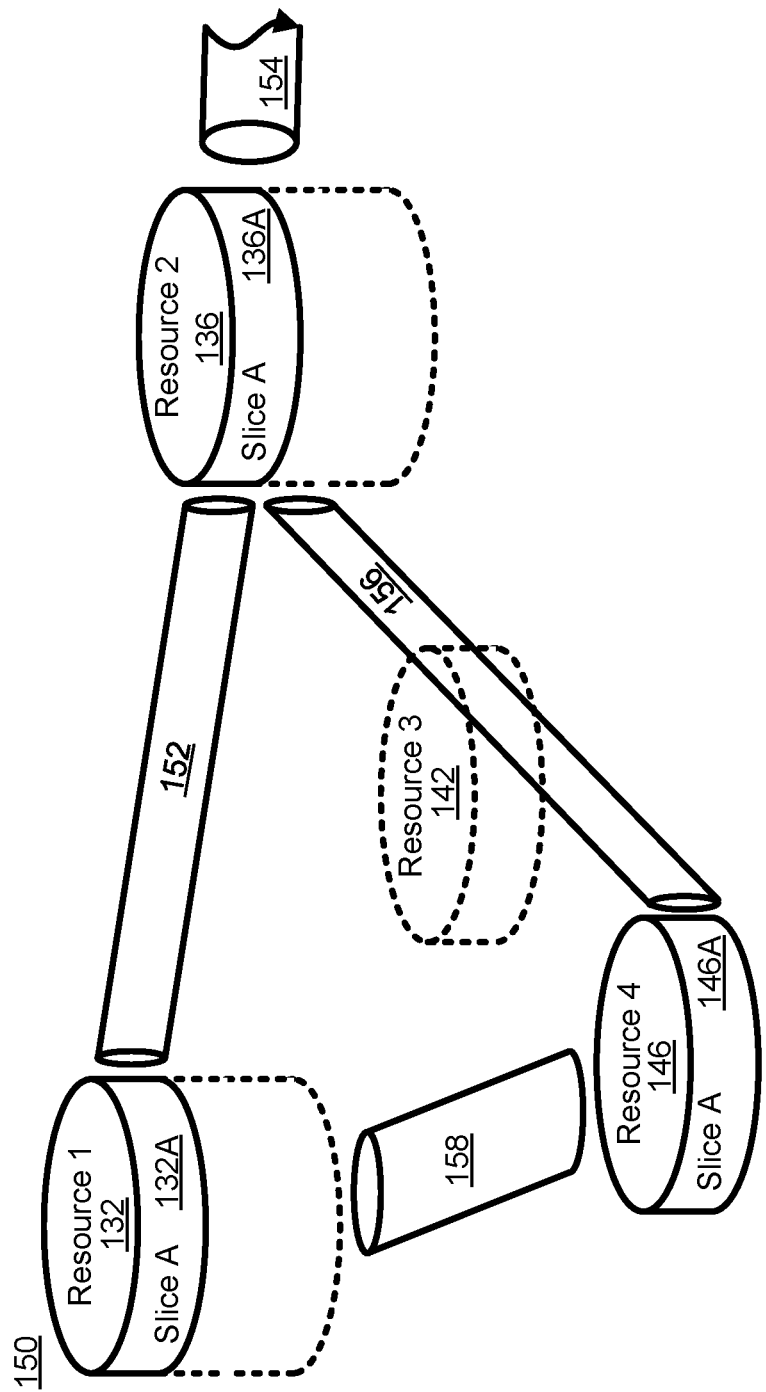
FIG. 6 is a block diagram illustrating the architecture discussed in FIG. 5 from the perspective of a single slice.

FIG. 6 illustrates the view of the architecture 136 of FIG. 5 as would be seen from the perspective of Slice A. This may be understood as a view of the resources allocated to Slice A 150 across the illustrated network segment. From within Slice A 150, only the portions of the resources that have been allocated to Slice A 150 are visible. Thus, instead of being able to see the full capacity and capability of Resource 1 132, the capabilities and capacity of the portion allocated to Slice A 132A is available. Similarly, instead of being able to see the capacity and capabilities of Resource 2 136, only the capabilities and capacity of the portion allocated to Slice A 136A are available. Because nothing from Resource 3 142 had been allocated to Slice A 150, Resource 3 142 is not present within the topology of Slice A 150. All of the capacity and capability of Resource 4 146 was allocated to Slice A 146, and as such is present within Slice A 150. Slice A 132A of Resource 1 132 is connected to Slice A 136A of Resource 2 136 by logical link 152. Logical Link 152 may correspond to the portion of connectivity resource 134 allocated to Slice A 134A. Slice A 136A is connected to logical link 154 (representative of the portion of connectivity resource 138 allocated to Slice A 150), and is connected to Slice A 146A by logical link 156. Logical link 156 is representative of the portions of connectivity resource 140 and connectivity resource 144 that have been allocated to Slice A (portions 140A and 144A respectively). It should be understood that due to the absence of Resource 3 142 from Slice A 150, any traffic transmitted by Slice A 136A onto Connectivity Resource 140A will be delivered to Resource 4 146, and similarly any traffic transmitted from Slice 146A into Connectivity Resource 144A will be delivered to Slice A 136A. As such, within Slice A 150 Connectivity Resources 140A and 144A can be modelled as a single logical link 156. Logical link 158 is representative of the portion of Connectivity Resource 148 allocated to slice A 148A.

It should be understood that within the storage and computer resources illustrated in FIGS. 5 and 6, NFs can be instantiated using any of a number of known techniques, including network function virtualization (NFV), to create Virtual Network Functions (VNFs). While conventional telecommunications networks, including so-called Third Generation and Fourth Generation (3G/4G) networks, can be implemented using virtualized functions in their CNs, next generation networks, including so-called Fifth Generation (5G) networks, are expected to use NFV and other related technologies as fundamental building blocks in the design of a new CN and RAN. By using NFV, and technologies such as Software-Defined Networking (SDN), functions in a CN can be instantiated at a location in the network that is determined based on the needs of the network. It should be understood that if a network slice is created, the allocation of resources at different data centers allows for the instantiation of a function at or near a particular geographic location, even within the slice where resources have been abstracted. This allows virtualized functions to be "close" in a physical sense to the location at which they are used. This may be useful, and may combined with a sense of topological closeness to select a logical location at which to instantiate a function so that it is geographically or topologically close to a selected physical or network location.

Figure 7:
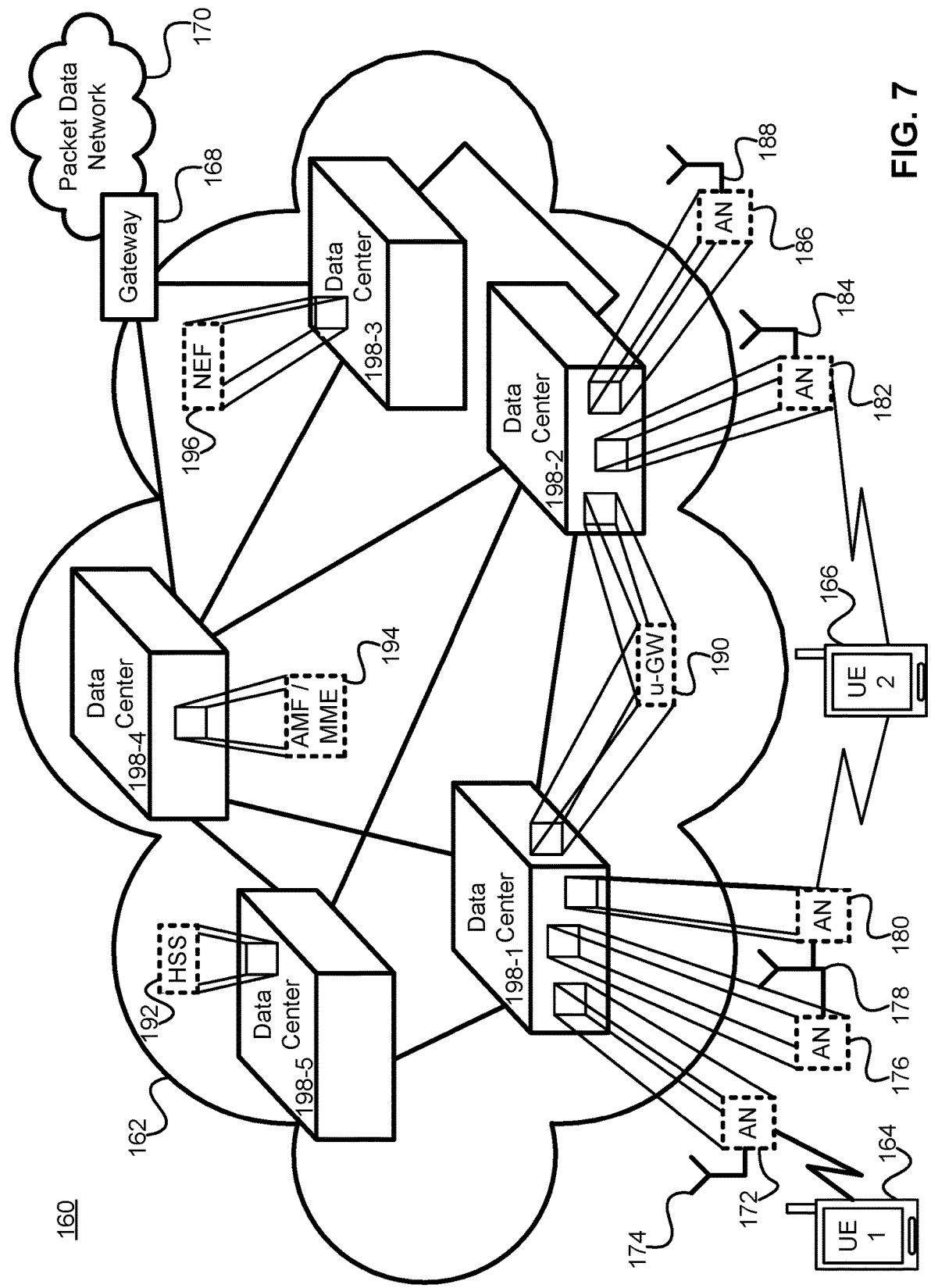
FIG. 7 is a diagram illustrating a cloud-based implementation of a Core Network and Radio Access Network using virtualized functions.

FIG. 7 illustrates a system 160 in which a core/RAN network 162 provides radio access and CN services to EDs 52 such as UE1 164 and UE2 166. In this figure, NFs are instantiated upon the underlying resources of a data center. The functions are shown as being exploded out of the pool of resources upon which they are instantiated. This is done to indicate that the functions act as independent entities and from a logical perspective they are indistinguishable from a physical node carrying out the same function. It should also be understood that in a sliced network where data centers provide the underlying resources upon which the slices are created, it is possible for a single network to have slices that support different versions of networks, so for example, in addition to having a virtualized network to support 5G traffic, a separate network slice can be created to support 4G networks. Traffic from EDs 52 can be routed through NFs, to a GW 168 that provide access to a packet data network 170 such as the Internet. Radio access services are typically provided by a RAN, which in this illustration is provided as a Cloud-RAN (C-RAN). Where a conventional RAN architecture was designed to be composed of discrete elements such as eNBs that were connected to the CN through a backhaul network, a C-RAN takes advantage of function virtualization to virtualize the Access Nodes (ANs) of the network. Much as a physical AN, such as an eNB, was connected to an antenna by a front haul link, in the illustrated embodiment of a C-RAN, ANs, such as a gNB are connected to an antenna (or to a remote radio head (RRH)) through a front haul connection, but are functions that are instantiated upon computer resources in network 162. If a gNB is divided into a CU and a plurality DUs, the virtualized DUs may in some embodiments be instantiated at or near the location of the antenna or RRH, while a CU may be instantiated at a data center to connect and serve a plurality of geographically dispersed DUs. For example UE1 164 is connected to the network through AN 172, which can provide radio access services through antenna 174. AN 172 is instantiated upon the compute and storage resources provided by a data center, in this case data center 198-1. Similarly AN 176 and AN 180, which are connected to the same set of antennae 178, are also instantiated upon the resources of data center 198-1. AN 180 provides radio access services to UE2 166, which also makes use of the access services provided by AN 182. AN 182 is connected to antenna 184, and is instantiated upon the resources of data center 198-2. AN 186 is connected to antenna 188, and is also instantiated upon the resources of data center 198-2. It should be understood that the front haul connections linking the virtualized ANs to the antennas or RRHs, may be direct connections, or they may form a front haul network. The integration of a C-RAN into a CN may obviate or reduce the concerns associated with backhaul connections as the AN functions may be co-located with CN functions. As such, data center 198-1 also serves as a location at which a user-specific GW function (u-GW) 190 is instantiated. This function is also instantiated in data center 198-2. Having a function instantiated at more than one data center may be part of a function migration processing which the function is moved through the network 162, or one of the instantiations may be an intentionally redundant instantiation. Both functions can be instantiated and configured, with only one of them active at a time, or they may both be active, but only one of them may be transmitting data to the UE. In other embodiments, such as those focused on Ultra-Reliable connections, such as Ultra-Reliable Low Latency Communications (URLLC), both functions may be active and transmitting data to (or receiving data from) an ED such as UE2 166. NFs such as a HSS 192, an AMF 194, or its predecessor Mobility Management Entity (MME), and a NEF 196 are shown as being instantiated on the resources of data center 198-5, 198-4 and 198-3 respectively.

The virtualization of the NFs allows a function to be located in the network 162 at a location topologically close to the demand for the service provided by the function. Thus, AN 172, which is associated with antenna 174, can be instantiated upon data center resources at the data center closest to the antenna 174, in this case data center 198-1. Functions such as an NEF 196, which may not need to be close to ANs, may be instantiated further away (in either or both of a topological or physical sense). Thus, NEF 196 is instantiated at data center 198-3, and the HSS 192 and AMF 194 are instantiated at data centers 198-5 and 198-4 respectively, which are topologically closer to the radio edge of the network 162. In some network implementations, data centers can be arranged hierarchically and different functions can be placed a different levels in the hierarchy.

Figure 8:
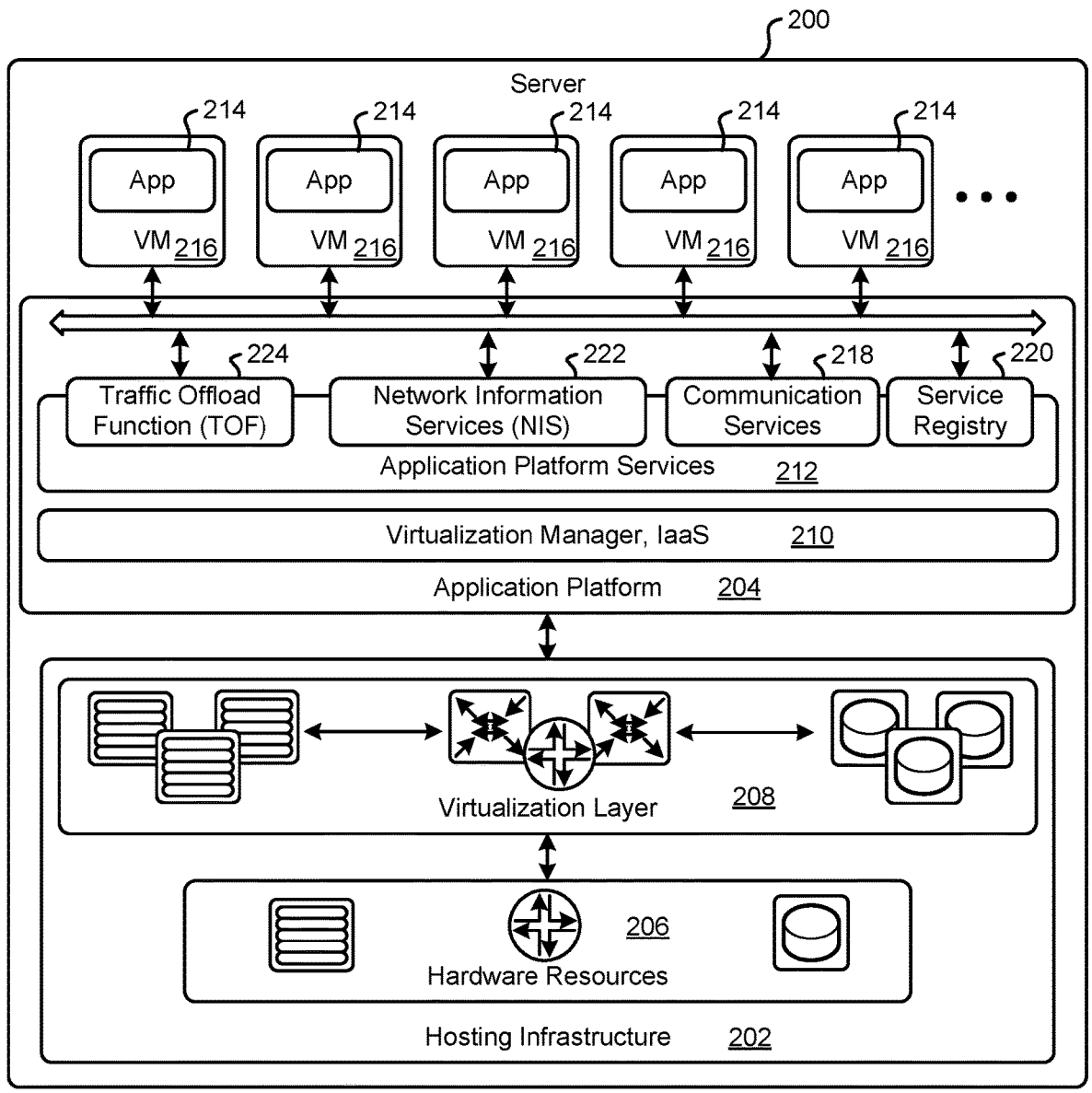
FIG. 8 is a block diagram illustrating a logical platform under which an ED can provide virtualization services.

FIG. 8 is a block diagram schematically illustrating an architecture of a representative server 200 useable in embodiments of the present disclosure. It is contemplated that the server 200 may be physically implemented as one or more computers, storage devices and routers (any or all of which may be constructed in accordance with the system 50 described above with reference to FIG. 1) interconnected together to form a local network or cluster, and executing suitable software to perform its intended functions. Those of ordinary skill will recognize that there are many suitable combinations of hardware and software that may be used for the purposes of the present disclosure, which are either known in the art or may be developed in the future. For this reason, a figure showing the physical server hardware is not included in this specification. Rather, the block diagram of FIG. 8 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 8, the illustrated server 200 generally comprises a hosting infrastructure 202 and an application platform 204. The hosting infrastructure 202 comprises the physical hardware resources 206, such as, for example, information processing, traffic forwarding and data storage resources) of the server 200, and virtualization layer 208 that presents an abstraction of the hardware resources 206 to the application platform 204. The specific details of this abstraction will depend on the requirements of the applications being hosted by the application layer (described below). Thus, for example, an application that provides traffic forwarding functions may be presented with an abstraction of the hardware resources 206 that simplifies the implementation of traffic forwarding policies in one or more routers. Similarly, an application that provides data stage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application 214 being hosted by the platform 204. Each "sandbox" may be implemented as a Virtual Machine (VM) image 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third parties may be deployed and executed with a respective VM 216. For example, MANagement and Orchestration (MANO) functions and Service Oriented Network Auto-Creation (SONAC) functions (or any of SDN, Software-Defined Topology (SDT), Software-Defined Protocol (SDP) and Software-Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications 214 to use.

Mobile-edge Computing allows cloud application services to be hosted alongside virtualized mobile network elements in data centers that are used for supporting the processing requirements of the C-RAN. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load function (TOF) service 224 may prioritize traffic, and route selected, policy-based, user-data streams to and from applications 214. The TOF service 224 may be supplied to applications 214 in various ways, including: a pass-through mode where (either or both of uplink and downlink) traffic is passed to an application 214, which can monitor, modify or shape it and then send it back to the original Packet Data Network (PDN) connection (e.g. a 3GPP bearer); and an End-point mode where the traffic is terminated by the application 214 that acts as a server.

The virtualization of NFs is considered to be a foundational technology for the architecture of flexible 5G networks. Function virtualization is a technology that allows for the creation of virtual functions on a base of compute, memory (which may include both executable memory and general storage) and connectivity or network resources. In many cases, these resources will exist within a data center. It should be understood that this discussion refers to resources instead of actual hardware because it is possible for virtualized resources to serve as the underlying resources for a next level of virtualization.

Virtualization may take the form of instantiating a virtual machine (VM) 216 that, to another entity on a network and to software executed on the VM 216, is no different than a physical node in the network. A VM 216 has its own set of compute, memory and network resources, upon which an operating system can be executed. The VM 216 can have a virtual network interface that can be assigned a network address. Between the underlying resources and the VM 216, there is typically a hypervisor that manages the resource isolation and network interactions. One of the purposes of a VM 216 is to provide isolation from other processes run on the system. When initially developed, a VM 216 was a mechanism to allow different network processors to operate without concern that a single errant process would be able to cause a complete system crash. Instead, an errant process would be contained to its own VM 216. This isolation allows for each VM 216 to have its own set of network interfaces. Typically, a single underlying resource can support a plurality of virtualized entities.

A more recent development has been the use of containers in place of VMs 216. Each VM 216 typically includes its own operating system, which typically increases redundant resource usage. Containers allow a single OS kernel to support a number of isolated virtual functions. In place of a hypervisor that allows each VM 216 to run its own OS, a single OS hosts containers that are responsible for enforcing the resource isolation that would otherwise be provided by the VM 216. Each virtualized function within in its own container can be provided a virtualized network interface so that it appears as its own network entity.

Figure 9:
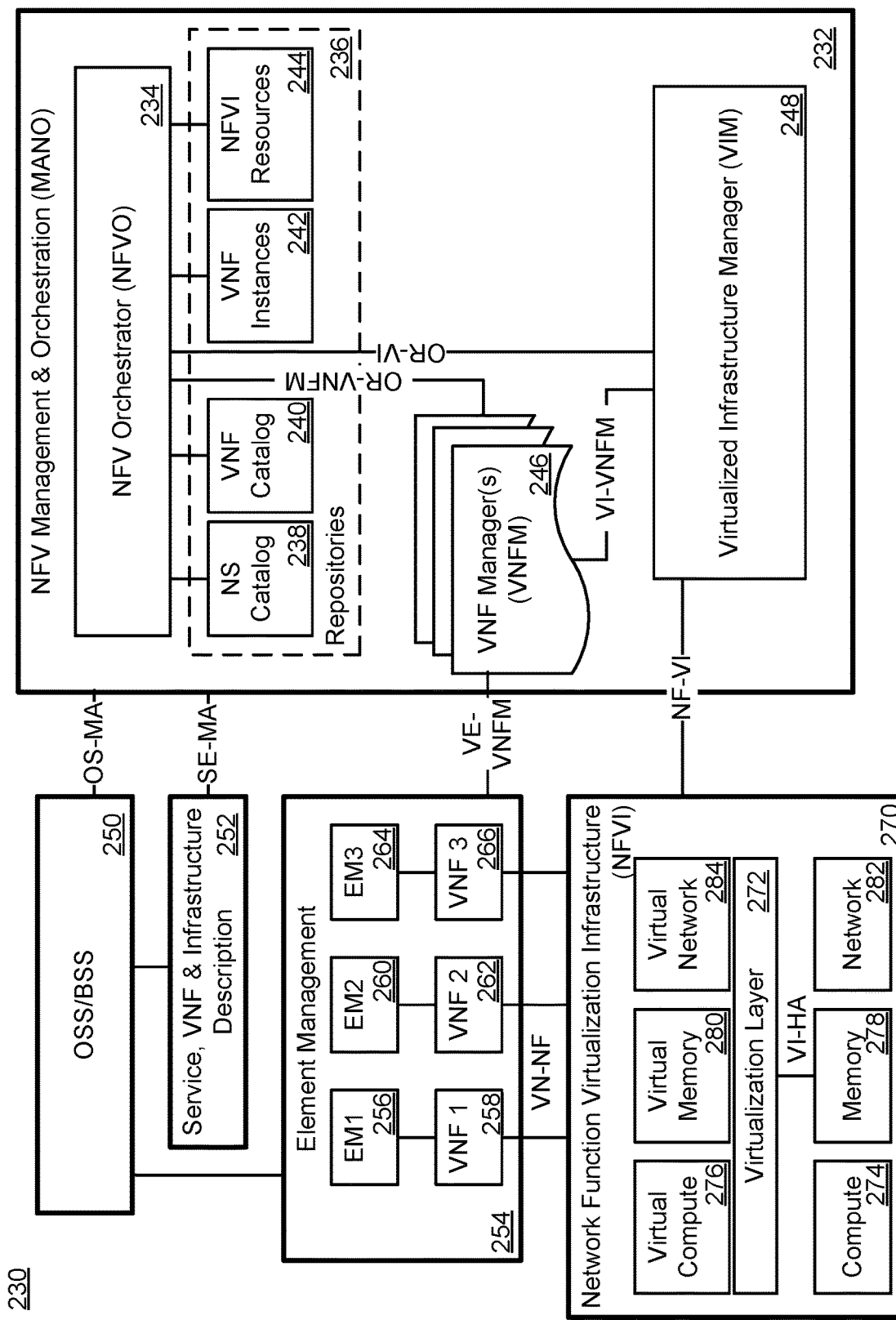
FIG. 9 is a block diagram illustrating an ETSI NFV MANO-compliant management and orchestration service.

With virtualization used in a networked environment, a question arises as to how the management of the instantiation, modification, and teardown of virtualized functions is managed or orchestrated. To address this concern, the European Telecommunications Standards Institute (ETSI) has developed a set of standards for Network Function Virtualization (NFV) MANagement and Orchestration (MANO). As illustrated in FIG. 9, the NFV-MANO system allows for the management of NFV instantiation and modification. As illustrated, there can be interfaces to existing systems such as the Operation Support System (OSS)/Business Support Subsystem (BSS) 250. In network architecture 230, an NFV-MANO system 232 includes an orchestrator 234 which can access libraries 236 such as Network Service catalog 238, VNF Catalog 240, VNF Instances repository 242 and NFVI resources repository 244. The NS Catalog 238 may include templates that can be used as the basis for supporting network services. VNF catalog 240 may contain templates for the instantiation of different classes of VNFs. A particular VNF, after being instantiated, may be referred to as a VNF instance, and its attributes may be stored in VNF instances repository 242. NFVI resources 244 may be used to track the availability of resources, including both virtual resources and the physical infrastructure upon which they are instantiated. The NFVI 244 can be connected to a number of VNF Managers 246 through an OR-VNFM interface, and to a Virtualized Infrastructure Manager (VIM) 248 through a OR-VI interface. The VNFM 246 and VIM 248 can be connected to each other through a VI-VNFM interface.

The NFV MANO 232 can communicate with an OSS/BSS system 250 through OS-MA interface, and to a Service, VNF & Infrastructure description database 252 through an SE-MA interface. The Service, VNF & Infrastructure description database 252 can contain operator information about the services, VNFs and infrastructure deployed in the network. Service, VNF & Infrastructure description database 252 and OSS/BSS 250 can be connected to each other so that the OSS/BSS 250 can update and maintain the Service, VNF & Infrastructure description database 252 as needed.

NFVI 270 interacts with the VIM 28 through the NF-VI interface. Underlying resources can often be classified as compute resources 274, memory resources 278 and network resources 282. Memory resources 278 may also be referred to as storage resources, while network resources 282 may also be referred to as connectivity resources. A virtualization layer 272 allows for the abstraction of the underlying resources that it is connected to through a VI-HA interface. It should be understood that the underlying resources may be either physical or virtual resources. The Virtualization layer 272 allows for the abstraction of the underlying resources into virtual compute resources 276, virtual memory resources 280 and virtual network resources 284. These virtualized resources can be provided to the element management system 254 through the VN-NF interface so that they can be used as the resources upon which the VNFs (shown as VNF1 258, VNF2 262 and VNF3 266) can be instantiated. An element manager (EM) 254 can be connected to the VNFM 246 within NFV MANO 232 through interface VE-VNFM, and to the OSS/BSS 250 through another interface. Each VNF instantiated upon the virtual resources provided by NFVI 270 can be associated with an EM (EM1 256, EM2 260 and EM3 264). The use of an EM allows the OSS/BSS 250 to have two paths through which the VNFs can be managed. A VNF can be managed through the VNFM 246, or through the EM associated with the VNF. Each EM can provide the same management controls that it would otherwise provide for a physical network element. Thus, the OSS/BSS 250 can treat each VNF as a conventional NF. Modification to the resource allocation associated with a VNF can be requested by an EM through the VNFM 246, or through a request from the OSS/BSS 250 over the OS-MA interface.

The virtualization of NFs allows functions to be deployed with the resources that are required and not with an intentional over provisioning. In conjunction with the above-described slicing and data center utilization, flexible networks can be deployed in a manner that allows an operator to dynamically modify the connectivity between functions (thus changing the logical topology of the network) and to dynamically modify the resources and location of the NFs (thus changing the physical topology of the underlying network). Additional resources can be allocated to existing functions to allow for scaling-up of an existing function, and resources can be removed from an allocation to allow for a scaling-down of a function. Resources from more than one resource pool or data center can be allocated to a function so that it can be scaled-out, and resources from different pools can be removed to allow a function to be scaled-in. Functions can be moved by transferring their state information to another NF, and in some instances, a function can be moved through a combination of scaling-out and scaling-in functions.

Figure 10:
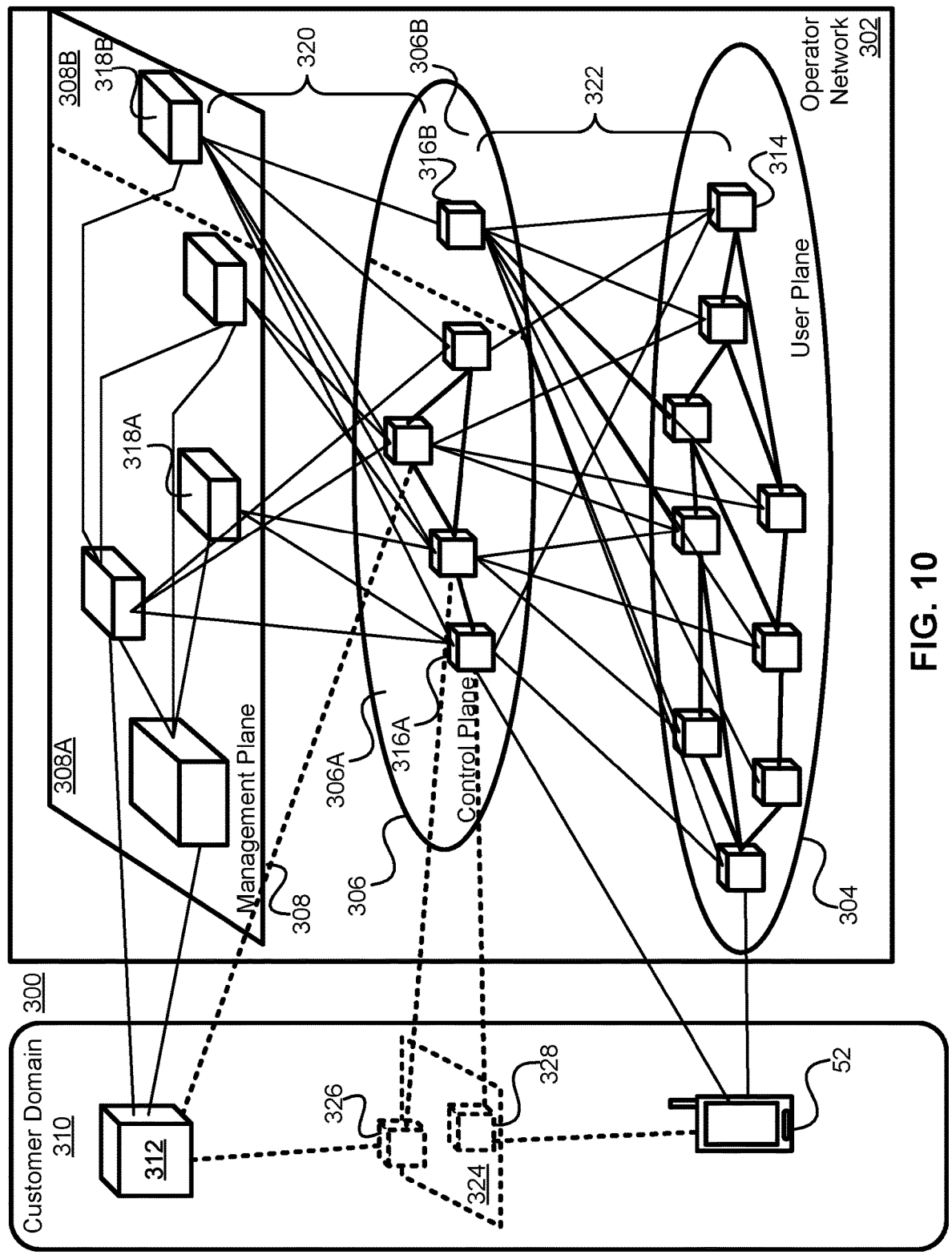
FIG. 10 is a diagram illustrating an embodiment of interactions between the Management Plane, Control Plane and User Plane of a network.

FIG. 10 illustrates a network architecture 300 in which the resources of the operator network 302 are divided into a set of logical planes, a UP 304, a CP 360 and a Management Plane (MP) 308. The UP 304 is typically focused on packet transport, but certain functions including packet filtering and traffic shaping can be performed in the UP 304, although this is typically performed based on instructions from a NF in the CP 306. Functions in the MP 308 receive input from NFs within the customer domain 310 about the policies that should be enforced by the network control functions in the CP 306. If Operator Network 302 supports network slicing, functions within MP 308 may be responsible for slice design and creation. It should be understood that a single MP 308 may be used to provide management functionality for a plurality of network slices that each have different control and user planes. Functions within the MP 308 can communicate with each other to ensure that the differing policies for a possible plurality of customers are fitted together in a suitable set of instructions.

UP 304 may also be referred to as a data plane (DP). It carries the traffic between an ED 52 and other external data networks (not shown) or functions within the operator network 302. UP 304 is typically composed of UP Functions (UPFs) 314. In some instances, a UPF 314 may be specific to a particular UE, it may be specific to a particular service (in some embodiments, it may be both user and service specific), and in other instances it may be a generic function serving a plurality of users and services. UPFs 314 are connected to each other to allow for DP traffic to be transmitted.

The CP 306 may be composed of CP Functions (CPFs) 316. In a 3GPP compliant network, some CPFs 316A have functions defined by standards, while other CPFS 316B may be outside the specification of the relevant standards. This may effectively result in the CP 306 being divided into a standards-compliant CP segment 306A and a non-standards compliant CP segment 306B. In a 3GPP-compliant CP segment 306A, NFs 316A such as an AMF, SMF, NEF, AUSF, etc. may be present, and in some embodiments more than one instance of any or all of the functions may be present. In a non-standards compliant CP segment 308B, a NF 316B such as an SDN Controller, or other such controllers including a SONAC-OPS controller, may be connected to other CPFs, as shown by functions 316A, but this is not necessarily required as may be seen by CPF 316B. ED 52 may also communicate with CPFs.

The Management Plane 308 can be divided between a standards-compliant section 308A and a non-standards compliant section 308B, much as CP 306 is divided. Within MP 308, NFs and nodes 318 can communicate with each other, and with a NF or node 312 within the customer domain 310. MP entities 318A (within the standardized section 308A) and 318B (within the non-standards compliant section 308B) can be used to establish policy, and the mechanisms by which policy is to be enforced, based on the resources available and requirements received from the customer 312 (and possibly a plurality of different customers). Network Management Functions (NMFs) 318 may be responsible for accounting and billing functions for element management, they may provide the services required for an OSS and a BSS. Outside the standardized functions, non-standardized NFs 318B may include an NFV-MANO system and a SONAC-Com controller.

NMFs 318 can receive external input from a customer node 312, and can communicate with each other. NMFs 318 can also communicate, over any of the MP-CP connections 320, with CPFs 316 to provide instructions about the policies to be enforced by CPFs 316. Changes in the resources underlying the network 302 are also communicated by an NMF 318 to CPFs 316. In CP 306, CPFs communicate with each other, and with ED 52. CPFs 316 are also in communication with UPFs 314, and through this communication they can receive information such as traffic loads on links and processing loads at NFs. In conjunction with policy information received from NMFs 318, a CPF 316 can transmit instructions to the UPFs 314, over the CP-UP (also referred to as UP-CP) connections 322, to govern the behaviour of the UPFs 314. A UPF 314 receives configuration information from a CPF 318, and handles UP traffic in accordance with the received configuration information. Loading information (which may include both processing and network connection (or link) loading) may be gathered by a UPF 314 and provided to a CPF 316.

In some embodiments, the customer NF 312 may have a connection to a CPF 316. This CPF 316 with which customer NF 312 communicates, may be either a 3GPP-compliant CPF 316A or a non-3GPP compliant CPF 316B. In alternate embodiments, the customer NF 312 may make use of a function within MP 308 to relay messages to functions in CP 306. Within the customer domain 310, there may be an optional CP 324, with customer CPFs 326 and 328. When such a customer CP 324 is present, functions 326 and 328 may have logical communications links with either or both of ED 52 and the customer NF 312. Customer CP functions 326 and 328 may have connections to functions within CP 306 (either 3GPP-compliant functions 316A or non-3GPP compliant functions 316B).

Shared PDU Session

The "hop-on" concept of Zhang may be supported by a two-step process of establishing a shared PDU session and thereafter binding one or more UEs 1252 to such shared PDU session as described herein. Such two-step process minimizes signalling exchanges between the UE(s) 1252 and the CN 114. A (shared) PDU session provides a UP connection for UE(s) 1252 from a serving RAN node 84 to one or more associated UPF(s).

In some examples, the UEs 1252 may be CIoT devices. However, it will be appreciated that the advantages of the disclosed two-step process of establishing and then binding a UE 1252 to a shared PDU session may have application to UEs 1252 generally, even if they are not CIoT devices.

A pre-configured shared PDU session is established by the CN 114 through an NMF 1100, such as an operation, administration and maintenance (OAM) function. The NMF 1100 provides relevant data regarding the UE 1252 to appropriate PCFs 86, UDMs 102 and the AMF 90. Then the NMF 1100 triggers the SMF 92 or the AMF 90 to establish the shared PDU session in which one or multiple UP connections between (R)AN nodes 84 and UPFs 86 may be established.

Thereafter, once the UE 1252 successfully registers to the CN 114 and makes a request for a PDU session, the CN 114 may automatically associate the UE 1252 with a previously registered shared PDU session in one of several manners described herein.

Despite the sharing of the PDU session among several UEs 1252, a facility is provided to differentiate between such UEs 1252 for QoS handling and charging and other purposes.

The disclosed process employs a hybrid solution, in which the exchange of UL packets and/or DL packets may make use of the shared PDU session. In some examples, it may be expedient for one or the other of UL packets and DL packets exchanged by a UE 1252 and a UPF 86 may make use of a dedicated PDU session while the other of them make use of the shared PDU session disclosed herein. By way of non-limiting example, it may be possible to employ the dedicated tunnel for DL packet delivery if the UE 1252 mobility is to be tracked.

As a general rule, it is expected that the UEs 1252 that will be bound to a common PDU session will have one or more features in common. Such UEs 1252 are said to comprise a UE group. The UEs 1252 that belong to a given UE group may not all be bound to a common shared PDU session. In some examples, the number of UEs 1252 in a given UE group may be so numerous that they may be further divided into sub-groups, each of which is associated with a separate shared PDU session. In some examples, a given UE 1252 in a given UE group may not be bound to a shared PDU session but may, for a variety of reasons have a separate PDU session established for it. In some examples, a given UE 1252 in a given UE group may never register with the CN 114 and thus may not be bound to a PDU session, whether shared or otherwise.

Nevertheless, the fact that the UEs 1252 within a given UE group have one or more features in common allows for policies to be established that would apply to the UEs 1252 within the UE group.

Without limitation, in some examples, the common feature(s) of the UEs 1252 in a UE group may be a set of capabilities that the UEs 1252 of the UE group support. In some examples, such capabilities may comprise a device class to which the UEs 1252 of the UE group are assigned. In this respect, the device class is used to indicate the capabilities of the UE 1252 in handling CN signaling, CN-supported features, and/or data type (IP, Ethernet, Unstructured Data), and/or PHY capabilities. The device class may, in some examples, include, or be considered as different from the UE category, which is indicative of the PHY layer capability of the UE 1252.

In some examples, the CN 114 may establish one or more network slice instances (NSIs) to serve the UEs 1252 belonging to a given device class.

In some examples, the device class(es) may be pre-defined and assigned a device class identifier which the capabilities associated with UEs 1252 of such device class can be efficiently communicated across signalling links. Thus, in some examples, the UE 1252 may send its associated device class identifier to the (R)AN node 84 across the radio resource control (RRC) signalling channel extending between them and/or the (R)AN node 84 may forward the device class identifier across the CN 114 to the UPF 86. In some examples, the UE 1252 may send its associated device class identifier to some CPFs, such as the AMF 90 and/or SMF 92.

By way of non-limiting example, Device Class 1 may be defined as those UEs that support only unstructured data transmission and make use of a single PDU session, while Device Class 2 may be defined as those UEs that support only Ethernet traffic and Device Class 3 may be defined as those UEs that support multiple types of traffic.

In some examples, the pre-definition of device class(es) may be localized to one or more public land mobile networks (PLMN). In the examples, the definition ascribed to various device classes may be universal across all PLMNs.

The device class of the UEs 1252 in a UE group is known to each UE 1252. Furthermore, the device class may be stored as part of the UE subscription information in the UDR and accessible by the UDM 102, or stored in UDM 102. Thus, if the UE 1252 does not transmit the device class identifier to the (R)AN 84 and/or to the CN 114 when it registers with the CN 114, the CPFs of the CN 114, such as, without limitation, the AMF 90, SMF 92 and PCF 100 may access the UDM 102 or UDR to retrieve the device class information. However obtained, the CPFs may use the device class information to provide different support to UEs 1252 in different device classes.

By way of non-limiting example, using the example device classes set out above, the CN 114 may understand that when a UE 1252 of Device Class 1 registers with it, the UE 1252 may not send a (separate) PDU Session Establishment Request to the CN 114, because both the UE 1252 and the CN 114 understand that the CN 114 will automatically associate the UE 1252, belonging to Device Class 1, with an existing shared PDU session associated with a UE group of Device Class 1.

In some examples, the device class may have preconfigured rules. By way of non-limiting example, UEs 1252 belonging to Device Class 1, may have a preconfigured Network Slice Selection Policy with pre-configured single network slice selection assistance information (S-NSSAI), quality of service (QoS) rules, and/or UE Route Selection Policy (URSP), data network name (DNN) Selection Policy, and/or other rules. If so, the CPFs such as the PCF 100 and SMF 92 may not send any CP messages to such UEs 1252, since the information and/or rules will be known by both the UE 1252 and the CN 114.

Figure 11:
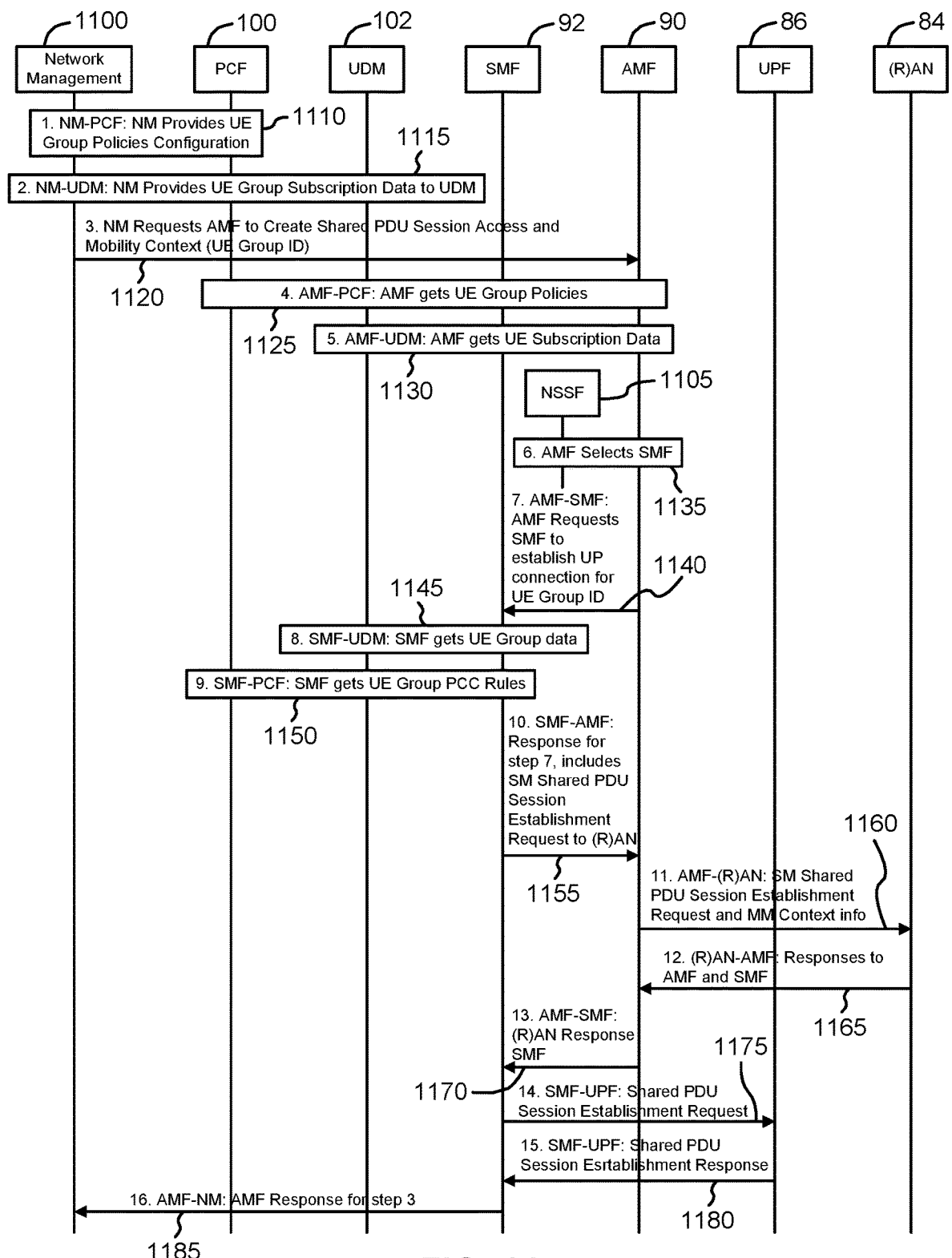
FIG. 11 is a signal flow diagram showing example signal flows to establish a shared PDU session according to an example.

The establishment of the shared PDU session is described in the example signal flow diagram FIG. 11. The figure shows communications between an NMF 1100, such as the OAM function, the PCF 100, UDM 102, SMF 92, AMF 90, a network slice selection function (NSSF) 1101, at least one UPF 86 and at least one (R)AN 84 to which it is expected that one or more of the UEs 1252 that will be bound to the shared PDU session will be associated.

The UEs 1252 that will be bound to the shared PDU session being registered will belong to a given UE group. The UE group can be represented by a UE group ID that may be unique within a PLMN. In some examples, the UE group ID may be an Internal Group ID such as is defined in 3GPP Technical Standard TS 23.501 entitled "System Architecture for the 5G System".

In FIGS. 11 through 14, individual message flows are shown by a line with an arrow. By contrast, messages between CPFs such as PCF 100, UDM 102, SMF 92 and AMF 90, such as the messages developed in 3GPP Technical Standard TS 23.502 entitled "Procedures for the 5G System" may be described using Service-based Interface (SBI) format, in which rectangles extending between two CPFs reflect a request from a first-identified CPF to a second-identified CPF and a corresponding response or acknowledgment from the second-identified CPF back to the first-identified CPF. Alternatively, the box could be replaced by two arrows, one to indicate a request (or subscription) from a first-identified CPF to a second-identified CPF and a corresponding response or acknowledgment (or notification) from the second-identified CPF back to the first-identified CPF. Some existing SBI messages may be used directly or with some modifications to deliver the messages in the present disclosure. Some new SBI messages may be designed to deliver the messages in the present disclosure.

The establishment of a shared PDU session corresponding to UEs 1252 of a given UE group may be initiated by the NMF 1100 sending 1110 UE group policies corresponding to the UE group to the PCF 100 and receiving a response thereto. The UE group policies may comprise, without limitation, policy control and charging (PCC) rules that may apply to either or both of individual UEs 1252 of the UE group (by way of non-limiting example, an individual UE 1252 QoS policy such as a per UE maximum bit rate (MBR)) or to the UE group as a whole (by way of non-limiting example, a UE group QoS policy such as an MBR for all UEs in the UE group).

The NMF 1100 sends 1115 to the UDM 102, subscription data corresponding to the UE group. The UE group subscription data may include, without limitation, one or more of an individual ID for a given UE 1252 (which may be, without limitation, its permanent equipment identifier (PEI) or a 5G subscription permanent identifier (SUPI)), subscription data for a given UE 1252 and data for the UE group as a whole (which may be, without limitation, a location ID for corresponding (R)AN node(s) 84 of all UEs 1252 in the UE group and/or a (R)AN-UPF connection topology and/or a UPF service area)). The individual ID information may permit identification of a particular UE 1252 within a UE group for charging and/or QoS purposes.

In some examples, signal flow 1115 may precede or follow signal flow 1110. The NMF 1100 may generate a unique internal group identifier and may send this identifier to other CP functions such as the UDM 102 and/or the PCF 100. The UDM 102 may create a unique internal group identifier and may send it to the NMF 1100. In some examples, the NMF 1100 may provide the internal group identifier generated by the UDM 102 to the PCF 100.

The NMF 1100 sends 1120 a request to create a shared PDU session to the AMF 90. The request may include the UE information (which may include, without limitation, UEs of the UE group and/or the UE group ID) and access and mobility context information corresponding to the UEs 1252 of the UE group, which may include, without limitation, an allowed area for the UEs 1252 of the UE group, a service area of the data network (DN) or local area data network (LADN) in which the UEs 1252 of the UE group can access services.

The AMF 90 may select a PCF 100 as described in 3GPP TS 23.501. The AMF 90 requests 1125 the selected PCF 100 to provide the UE group policies corresponding to the UE group ID specified in the request and receives the UE group policy information therefrom. From the UE group policy information, the AMF 92 may create policies to be applied to all UEs 1252 of the UE group and/or policies to be applied to individual UEs 1252. By way of non-limiting example, the UE group policies may include access and mobility, which may include an allowed area in which the UEs 1252 of a UE group can send and receive data. The individual UE policies to be sent to UEs 1252 may include, by way of non-limiting example, a UE route selection policy (URSP), an access network discovery & selection policy (ANDSP) as specified in 3GPP TS 23.503 published in December 2017, an allowed NSSAI, a network identity and time zone (NITZ), mobility restrictions, LADN information and/or a tracking area identity (TAI) list. Such policies may be sent to the UEs 1252, without limitation, during registration of the UEs 1252 with the CN 114, during a configuration update of a UE 1252, or during the binding of a UE 1252 to a shared PDU session discussed in connection with any one of FIGS. 12-14.

The AMF 90 may register itself with the PCF 100 as the serving AMF for the shared PDU session, for example by using a policy association establishment procedure. The AMF 90 may subscribe to PCF notification services to receive notifications related to the shared PDU session and/or the UE group.

If the UE group subscription data is not available in the AMF 90, the AMF 90 may select a UDM 102 and request 1130 the selected UDM 102 to provide the UE group subscription data for the UEs 1252 of the UE group corresponding to the UE group ID specified in the request and receives the UE group subscription data therefrom. In some examples, signal flow 1125 may precede, be concurrent with or follow signal flow 1130.

The subscription data may include existing shared PDU session identifiers of the UE group. The UDM 102 may generate a new shared PDU session identifier and send it to the AMF 90. The UE group subscription data may include an identifier of individuals UEs 1252 in the UE group, including, without limitation, the SUPI, generic public subscription identifier (GPSI) an external identifier, a group policy, and/or the location of individual UEs 1252 (such as an address of a (R)AN node 84 that serves a UE 1252).

If the AMF 90 is responsible for generating a shared PDU session ID, it may create such shared PDU session ID and provide it to the UDM 102 in signal flow 1130.

The UE group subscription data may include access and mobility subscription data and/or SMF selection subscription data as described in 3GPP TS 23.501 and TS 23.502. The UDM 102 may have this data or may access UDR to get the data and locally store it. The SMF selection subscription data may, in some examples, also include an indication of the SMF 92 that is capable of serving the shared PDU session.

The AMF 90 may select 1135 the SMF 92 to serve the UE group for which the shared PDU session is being established. In some examples, the AMF 90 may issue a request to the NSSF 1105 to discover one or more SMFs 92 for possible selection and receives the discovered SMF(s) 92 therefrom. In some examples, the AMF 90 specifies the UE group ID to the NSSF 1105. In some examples, the AMF 90 may be configured to select a default SMF 92.

However selected, the AMF 90 requests 1140 the selected SMF 92 to establish a shared PDU session context for the UE group specified in the UE group ID. The AMF 90 may include the shared PDU session ID, whether generated by the AMF 90 or UDM 102, in request 1140.

The AMF 90 may also include in request 1140 the list of (R)AN addresses that serve UEs of UE group, according to the information received in step 1120 and/or step 1125, and/or step 1130, and/or known information in the AMF 90. The AMF may also include the location of individual UEs 1252 of UE group, represented by the (R)AN 84 address for example. The AMF 90 may also include the list of UE IDs (e.g. PEI and/or SUPI and/or GPSI) of UEs 1252 of UE group. The AMF 90 may include the address (e.g. IP address or FQDN) of PCF 100 and/or the address of UDM 102, obtained in step 1125 and 1130 respectively. The AMF may also include Access Type, RAT type, Network Slice information (e.g. S-NSSAI).

The selected SMF 92 may select a UDM 102. In some examples, the UDM 102 selected by SMF 92 may be different from the UDM 102 selected by the AMF 90. The SMF 92 requests 1145 its selected UDM 102 to provide the UE group subscription data corresponding to the UE group ID specified in the request and receives the UE group subscription data therefrom. In some example, the response of UDM 102 may comprise the UE group subscription data corresponding to the UE group ID specified in the request, one or more IDs of a UE 1252 in the UE group (including, without limitation, the SUPI, an external ID and/or the GPSI), an external group ID (including, without limitation, an international mobile subscriber identity (IMSI) group ID), an MBR of the UE group as a whole, and/or an MBR of one or more individual UEs 1252.

If the UDM 102 is responsible for generating a shared PDU session ID, it may also generate a new shared PDU session ID if such ID was not previously generated, and sends such ID to the SMF 92 in signal flow 1145. Alternatively, the SMF 92 may be responsible for generating the shared PDU session ID, in which case, the SMF 92 may send the shared PDU session ID to other network CPFs functions in one or more of the signal flow(s) herein. In some examples, the selected SMF 92 may have local information regarding the (R)AN-UPF connection topology. Otherwise, the response from the PCF 100 may include the (R)AN-UPF connection topology and/or additional UE group subscription data relevant to the selected SMF 92, of all UEs 1252 of the UE group corresponding to the UE group ID specified in the request.

In some examples, the NMF 1100 may configure a Network Repository Function (NRF) to store the (R)AN-UPF connection topology used for shared PDU session.

In some examples, the UPF may register with the NRF.

The SMF 92 may access the NRF to obtain the (R)AN-UPF connection topology to establish an UP connection of the shared PDU session. The (R)AN-UPF connection topology may contain connection information between any two UP NFs (including, without limitation, UPFs and/or (R)AN nodes). The connection information may indicate the capacity of logical links between UP NFs, their addresses (including without limitation, their IP address and/or fully qualified domain name (FQDN) and/or the processing capability of ports of UP NFs. The SMF 92 may select one or more UPF(s) 86 to serve the shared PDU session.

In request 1145, the AMF 90 may also register with the UDM 102 as the serving AMF for the shared PDU session. The AMF 90 may subscribe to notification services of UDM 102 for notifications related to the shared PDU session and/or UE group. During the registration procedure, the AMF 90 may provide the UDM 102 with the identity and/or address of the AMF 90, the S-NSSAI, the UE group ID and/or, if the SMF 92 is responsible for creating it, the shared PDU session ID. The UDM 102 stores such information, together with other information of UEs 1252 of the UE group in a UE group context.

The AMF 90 may create a UE group context if one does not exist, to store all the data related to the UE group. The AMF 90 may create a shared PDU session context within the UE group Context to store data related to the shared PDU session.

The AMF 90 may create a Mobility Management (MM) context for the UE group after getting the mobility subscription data from the UDM.

In request 1145, the SMF 92 also registers with the UDM 102 as the serving SMF for the shared PDU session ID. During the registration, the SMF 92 may provide information, including without limitation, the UE group ID, the identity and/or address of the SMF 92, the associated DNN, and/or, if the SMF 92 is responsible for generating it, the shared PDU session ID. The UDM 102 stores such information in a UE group context. The SMF 92 may subscribe to notification services of the UDM 102 for notifications related to the UE group and/or the registered shared PDU session.

The selected SMF 92 may select a PCF 100, which may be different from the PCF 100 selected by the AMF 90. The selected SMF 92 requests 1150 the selected PCF 100 to provide the UE group PCC rules corresponding to the UE group ID specified in the request and receives the UE group PCC rules therefrom in a procedure, which could be the same or a modified version of the Session Management Policy Establishment procedure, as defined in 3GPP TS 23.502, clause 4.16.4.

The SMF 92 may provide IP address(es) and/or IP prefix(es) that may be allocated to one or multiple UPFs 86 that provide N6 communication link(s) coupling the UPF 86 and the Data Network (DN).

The UE group PCC rules may comprise rules that may apply to either or both of individual UEs 1252 of the UE group corresponding to the UE group ID specified in the request and to all UEs 1252 of such UE group. By way of non-limiting example, the QoS rules for the UE group and/or shared PDU session may include, without limitation, QoS parameters, such as MBR, guaranteed flow bit rate (GFBR), and/or maximum flow bit rate (MFBR) of all UEs 1252 in both UL and DL directions, depending on time of day, packet delay budget (PDB), a maximum data burst volume (MDBV) for low-latency applications, traffic steering rules for edge computing applications, a packet filter description by which the UPF 86 may classify packets, DNN and/or allowed PDU session type (including, without limitation, IP (IPv4, IPv6), Ethernet, unstructured data types). In some examples, the MBR, GFBR and/or MFBR may have different values provided at different times during the day. The QoS rules may include without limitation, parameters to be applied for individual UEs 1252, such as a shared PDU session MBR, GFBR, MFBR, PDB and/or a packet filter description by which the UPF 86 may classify packets. In some examples, such parameters may have different values at different times during the day. By way of non-limiting example, the charging rule may specify that charging is applied to the UE group as a whole, or individual UEs.

Armed with the UE group subscription obtained in request 1145 from the UDM 102 and the UE group PCC rules obtained in request 1150 from the PCF 100, the selected SMF 92 establishes a UE group context if one does not exist, and/or a shared PDU session context for one or more shared PDU session(s) for the UEs 1252 of the UE group. Each established shared PDU session will have a corresponding shared PDU session ID, which may be unique within the selected SMF 92, within the UE group, within a NSI serving the UE group, or within the whole PLMN. As discussed previously, the shared PDU session ID may be generated by the SMF 92, by the AMF 90, by the UDM 102, or by the NMF 1100.

As discussed previously, the UE group PCC rules may allow sharing of UP connections, including, by way of non-limiting example, the UEs 1252 in a UE group may have different device class IDs and/or or support different type of data (IP, Ethernet, or unstructured data). If so, signal flows 1155 through 1180 are performed. If not, the SMF 92 sends an error code (and/or cause code) to the AMF 90 (not shown) and processing proceeds directly to signal flow 1185.

The selected SMF 92 responds 1155 to the request 1140 from the AMF 90 to establish an UP connection for a shared PDU session context for the UE group. The response 1155 comprises the UE group ID and a shared PDU session ID for one of the shared PDU session(s) for the UE group. The shared PDU session ID may in some examples be the same as the SM Context Identifier as described in 3GPP TS 23.502.

The response 1155 also comprises one or more SM shared PDU session establishment requests to the AMF 90 for forwarding on to each (R)AN node(s) 84 associated with the UEs 1252 of the UE group along the N2 communications link coupling them.

Each SM shared PDU session establishment request may comprise a (R)AN address to which the request is directed, one or more UE IDs (including without limitation, the SUPI, GPSI, and/or the 5G-global unique temporary ID (GUTI)) that could be served by the shared PDU session, the shared PDU session ID, one or more QoS profiles and/or QoS flow identifiers (QFI), network slice information (including, without limitation, S-NSSAI), a data type (including, without limitation, a PDU session type), an MBR, GFBR and/or MFBR of the shared PDU session and/or UPF tunnel information. The UPF tunnel information may comprise, without limitation, a list of UPF addresses and/or a list of UL tunnel endpoint identifiers (TEID) that correspond to a tunnel connection coupling a (R)AN node and a UPF.

The response 1155 may also comprise an SM message to be sent along a logical N1 communications link coupling the UE 1252, to the AMF 92 through the (R)AN 84, when the UE 1252 registers with the CN 114, or is bound to the shared PDU session discussed in connection with FIG. 12-14. The SM message may be a common message to be sent to any UE 1252 of the UE group. The SM message may, in some examples, contain QoS rules and/or QFI.

For each (R)AN node 84 serving the UE group, the AMF 90 may create an next generation application protocol (NGAP) UE Group—transport network layer (TNL) association (TNLA) binding to establish a control link connection with the (R)AN node 84 for the UE Group. In some examples, such a control link could be an N2 communications link coupling the (R)AN node 84 and the AMF 90.

The AMF 90 sends 1160 the at least one (R)AN node(s) 84 associated with the UEs 1252 of the UE group, along the N2 communications link coupling them, the shared PDU session establishment request and/or an SM message received 1155 from the selected SMF 92 intended for the UE 1252 along a logical N1 communications link coupling the AMF 90 and the UE 1252, and may be mobility management (MM) context information obtained in signal flow 1120 and/or signal flow 1130. The MM context information may comprise, without limitation the UE group ID, access and mobility policies for the UE group and/or network slice information (including, without limitation, an NSI ID (NSI-ID) and/or S-NSSAI information) that the UE group may be allowed to access. In some examples, the MM context information may comprise, without limitation, UE IDs (including, without limitation, SUPI) or another list of the UEs 1252 of the UE group corresponding to the UE group ID. In some examples, the access context information may contain security keys (including, without limitation, data encryption keys) that may be used by UEs 1252 of the UE group. In some examples, the AMF 90 may obtain such security keys from the AUSF 94 (not shown) after signal flow 1120.

The (R)AN node(s) 84 create(s) a shared PDU session context internally, in which it stores information related to the UE group and and/or shared PDU session, including, without limitation, the shared PDU session ID, information of the UEs 1152 that are to be associated with the shared PDU session ID and/or access and mobility management information. The creation of a shared PDU session context and the storing of related information in the shared PDU session context may occur after signal 1165 described below.

The (R)AN node(s) 84 sends 1165 to the AMF 90, along an N2 communications link coupling them, a response to the shared PDU session establishment request 1160 to be forwarded by the AMF 90 to the selected SMF 92. The response 1165 comprises, without limitation, (R)AN tunnel information, such as, without limitation, the (R)AN address and/or a list of DL TEIDs of tunnels that connect the (R)AN node 84 and UPF(s) 86.

The AMF 90 forwards 1170 to the selected SMF 92, the response 1165 received from the (R)AN node(s) 84 to the shared PDU session establishment request 1160.

The selected SMF 92 sends 1175 to at least one UPF 86 associated with the UEs 1152 of the UE group a shared PDU session establishment request. The request 1175 comprises, without limitation, the (R)AN tunnel information (including, without limitation, (R)AN address(es), the UL and/or DL TEID for each (R)AN address, UE information (including, without limitation, the SUPI and/or IP Address) that may be associated with the (R)AN address), PCC rules (including, without limitation, packet detection, enforcement and/or reporting rules to be installed on the UPF 86 for the shared PDU session) for individual UEs 1252 of the UE group and/or PCC rules for the UE group as a whole. In some examples, the UPF(s) 86 can use a PCC packet detection rule to classify arriving DL packets into PDU sessions, including without limitation, a shared PDU session, and QoS flows of PDU sessions, to be sent to (R)AN nodes. In some examples, the UPF(s) 86 can use a PCC enforcement rule, including without limitation, a QoS enforcement rule for QoS enforcement for PDU sessions, including without limitation, a shared PDU session, and QoS flows of PDU sessions. In some examples, the UPF(s) 86 can use a PCC reporting rule, including, without limitation, for traffic counting and reporting. Some other rules, such as, without limitation, a packet forwarding action rule, may be included as described in 3GPP TS 23.502, clause 5.8.2.11.1.

The UPF(s) 86 create(s) a shared PDU session context to store information provided by the SMF 92.

The UPF(s) 86 send(s) 1180 to the selected SMF 92 a response to the shared PDU session establishment request 1175.

The AMF 90 sends 1185 the NMF 1100 a response to the request 1120 to create a shared PDU session, thus signalling that the shared PDU session(s) has(ve) been established.

Thus, the shared PDU session(s) may be established for the UEs 1152 of the UE group, where none, some or all UEs 1252 of the UE group have registered with the CN 114. The pre-establishment of the shared PDU session(s) will reduce the time to bind a UE 1152 of the UE group to a PDU session when the UE 1152 registers with the CN 114.

In some examples, the configuration by the SMF 92 of the (R)AN 84 in signal flows 1160 and 1165 may occur before or after configuring the UPF 86 in signal flows 1175 and 1180. By way of non-limiting example, signal flow 1175 may occur after signal flow 1150. However, since the (R)AN 84 is not configured, the SMF 92 may not provide the DL TEID, which may be assigned by the (R)AN 84, to the UPF 86. The UPF 86 may also assign the UL TEID for the shared PDU session and send it to the SMF 92 in signal flow 1180 if the UPF 86 is in charge of creating the UL TEID. After configuring the UPF 86, the SMF 92 may configure the (R)AN 84 as described in signal flows 1155, 1160, 1165 and/or 1170. After configuring the (R)AN 84, the SMF 92 has the DL TEID(s) of the UPF 86. The SMF 92 may send a shared PDU session modification message (not shown) after signal flow 1180 to provide the DL tunnel information, which may consist, without limitation, of the (R)AN address, the UL and/or DL TEID and/or information of the UEs (including, without limitation, the UE ID and/or IP address if available) that use the UL and DL TEID(s).

In FIG. 11, the NMF 1100 sends a request to the AMF 1100 first to trigger the shared PDU session procedure. In another embodiment, the NMF 1100 may sends a request for shared PDU session establishment to the SMF 92. The NMF 1100 may provide SMF 92 with information as described in step 1125 of FIG. 11, and may include the AMF 90 information. Next, the SMF 92 may select an AMF if the information on AMF is not provided by the NMF 1100. The SMF may request a Network Repository Function (NRF) to get the AMF address, by providing network slice information (such as S-NSSAI), UE group ID, DNN, Tracking Area Identity (TAI) list. In some non-limiting examples, the TAI may indicate the location(s) of UEs that may use the shared PDU session. Other parameters that may, in some non-limiting examples, be used to indicate the location(s) of UEs may include a list of (R)AN nodes, a registration area and/or a UPF service area. The SMF 92 may perform step 1145 and step 1150 of FIG. 11. Then the SMF 92 may send to the selected AMF 90 a shared PDU session establishment. The SMF 92 may provide N1 SM and N2 SM information as described in step 1155 of FIG. 11. The SMF 92 may also provide network slice information (e.g. S-NSSAI), UE Group ID for the AMF 90. The AMF 90 may perform steps the same as steps 1125 and 1130 to obtain UE subscription information and policy information. The AMF may then create N2 MM message to send mobility information to each (R)AN 84, together with N1 SM and N2 SM messages received from the SMF 92, as described in steps 1155 and 1160. The (R)AN 84 may send response messages to the AMF 90 and SMF 92 as described in step 1165 and step 1170 of FIG. 1100. The SMF 92 may configure the UPF 86 as described in step 1180.

In another embodiment, a UE of UE group may register to the PLMN according to the General Registration procedure specified in 3GPP TS 23.502, clause 4.2.2.2.2 for example, during this procedure, if the network policy provided by the PCF 100 indicate possibility to use shared PDU session for the UE group, the AMF 90 (or a new AMF 1290) may request the SMF 92 to establish a shared PDU session during UE registration procedure or after the UE registration procedure finishes. The steps 1125 to 1180 of FIG. 11 may be used to establish the shared PDU session.

In another embodiment, the UL or DL tunnel of shared PDU session may be used by the one or some UEs 1252 of UE group. It means that the UL and/or DL TEID may be created during the creation of shared PDU session. Alternatively, the UL and/or DL TEID may be created after creation of shared PDU session, when a UE register to the network or request a PDU session establishment.

In some examples, the shared PDU session may be created by the following (not shown):

The first UE 1252 of a UE group performs a registration procedure as described in 3GPP TS 23.502, clause 4.2.2.2.

The first UE 1252 of a UE group requests a PDU session establishment as described in TS 23.502, clause 4.3.2. The AMF 90 may select an SMF 92 that is capable of handling shared PDU session for the UE group by using information provided by the UDM 102, including without limitation, at least the information comprising internal group ID information of the UE 1252 and/or an indication to employ a shared PDU session.

The SMF 92 may determine to use the newly created PDU session as a shared PDU session for other UEs 1252 of the same UE group by using information provided by the UDM 102, including without limitation, at least the information comprising internal group ID information of the UE 1252 and/or an indication to employ a shared PDU session. The SMF 92 may inform the AMF 90 that the newly created PDU session shall become a shared PDU session.

The AMF 90 may request the UDM 102 to provide it with UE group subscription information substantially as described in signal flow 1125.

The AMF 90 may request the PCF 100 to provide it with policy control information substantially as described in signal flow 1130.

The SMF 92 may request the UDM 102 to provide it with UE group subscription information substantially as described in signal flow 1145.

The SMF 92 may request the PCF 100 to provide it with policy control information substantially as described in signal flow 1150.

The second UE 1152 of a UE group performs a registration procedure as described in 3GPP TS 23.502, clause 4.2.2.2.

The second UE 1152 requests a new PDU session. The CP functions may perform a procedure to bind the second UE 1152 to the existing shared PDU session, including without limitation the following:

The AMF 90 may request the SMF 92 to modify the shared PDU session.

The SMF 92 may send to the UPF 86 a PDU Session Modification request along the N4 communications link coupling the SMF 92 and the UPF 86 to provide additional information regarding the second UE, a PCC rule update, if the PDU session type is of an IP or Ethernet data type, a packet filter description information and/or, if the PDU session type is of an unstructured data type, IP address(es) and/or IP prefix(es) for the N6 communications link coupling the UPF 86 and the DN 88. The UPF 86 may send a response to the SMF 92 along the N4 communications link coupling the SMF 92 and the UPF 86.

The SMF 92 may send to the (R)AN node 84 an SM PDU Session Modification request along the N2 communications link coupling the (R)AN node 84 via the AMF 90; and the SMF 92 to provide additional information regarding the second UE and/or QoS information (including, without limitation, a QoS profile update). The (R)AN node 84 may send an SM response to the SMF 92 along the N2 communications link coupling the (R)AN node 84 and the SMF 92.

The SMF 92 may send an SM PDU session establishment response message to the second UE 1252 along the logical N1 communications link coupling the AMF 90 and the UE 1252, which may contain QoS information (including without limitation, QoS rules and/or the QFI), if the PDU session type is of an IP data type, IP address(es) and/or IP prefix(es) for the shared PDU session. The second UE 1252 may send an SM response to the SMF 90 along the logical N1 communications link coupling the AMF 90 and the UE 152. This completes the binding procedure.

In some examples, a shared PDU session has been established and is being served by an AMF 90 (denoted as a target AMF 90) and by an SMF 92. A second UE 1252 registers with the CN 114, and the (R)AN node 84 may select another AMF 90 (designated as an initial AMF 90) to serve the second UE 1252. The initial AMF 90 may access the UDM 102 to get user subscription data. The UDM 102 may provide information of the target AMF 90 and UE group information to the initial AMF 90. The initial AMF 90 may perform an AMF relocation procedure as described in 3GPP TS 23.502, clause 4.2.2.2.3 "Registration with AMF re-allocation", published in December 2017, so that the target AMF 90 can replace the initial AMF 90 to serve the UE 1252 and the target AMF 90 may select the same SMF 92 to bind the second UE 1252 with the existing shared PDU session.

In some examples, a shared PDU session has been established and is being served by an AMF 90 (denoted as a target AMF 90) and by an SMF 92. A second UE 1252 registers with the CN 114, and the (R)AN node 84 may select another AMF 90 (denoted as an initial AMF 90) to serve the second UE 1252. The initial AMF 90 may access the UDM 102 to get user subscription data. The UDM 102 may provide the information of the UE group of the second UE 1152 and the SMF 92 serving the shared PDU session to the initial AMF 90. The initial AMF 90 may continue serving the second UE 1152. The initial AMF 90 may select the same SMF 92 to bind the second UE 1252 with the existing shared PDU session. Alternatively, the initial AMF 90 may select an SMF 92 that belongs to the same SMF set as the SMF 92 serving the shared PDU session.

Figure 12:
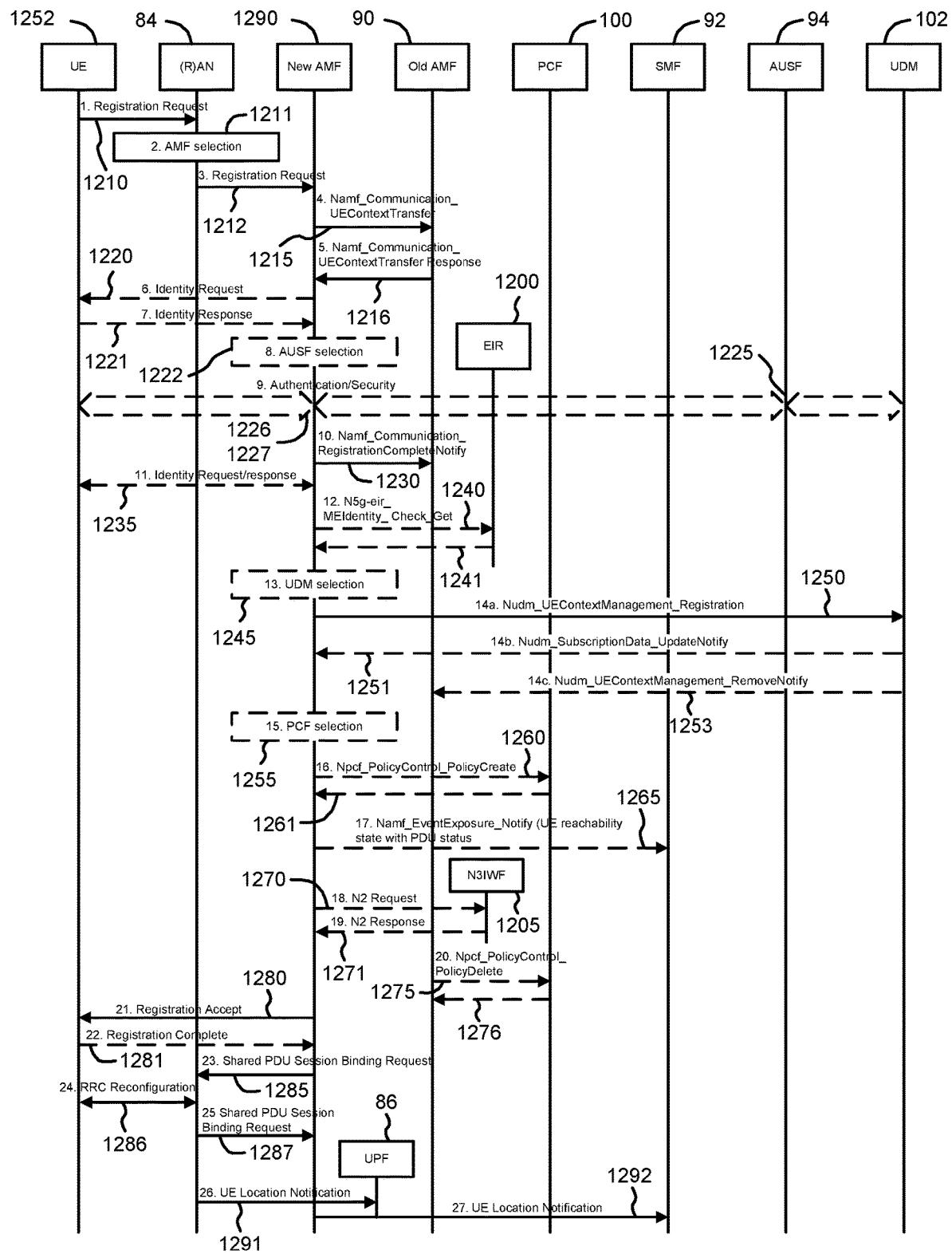
FIG. 12 is a signal flow diagrams showing example signal flows to cause the (R)AN to directly bind a UE associated therewith that has registered with the CN with the shared PDU session of FIG. 11, without involving the SMF according to an example.

One example method of binding a UE 1252 that has registered with the CN 114 involves a direct binding by the (R)AN node 84 associated with the UE 1252 of the UE 1252 with the shared PDU session established in FIG. 11, as shown in FIG. 12. Some of the signal flows set out in FIG. 12 are in common with the general procedure for registering a UE 1252 with a PDU session in accordance with 3GPP TS 23.502, version V1.2.0, published in September 2017.

Those having ordinary skill in the relevant art will appreciate that the actions disclosed in the present disclosure may incorporate any or all versions (whether or not later than a version and/or publication date specified herein) of the various Technical Specifications referenced herein, including without limitation TS 23.501 and/or TS 23.502.

The information elements and signal flows that are different from the procedure in TS 23.502, V1.2.0 are specifically identified in the present disclosure by the text "(in the case of a shared PDU session)".

The method of FIG. 12 is simple and does not involve signalling between the UE 1252 and the SMF 92 to establish a PDU session, and allows the UE 1252 to send UL data quickly upon registering for the CN 114. In the method of FIG. 12, the (R)AN node 84 associated with the UE 1252 associates such UE 1252 with a UL TEID that identifies a tunnel along an N3 connection coupling the (R)AN node 84 with at least one UPF 86 associated with the UE 1252, based on the S-NSSAI and/or UE group ID information that the (R)AN node 84 received from the AMF 90 in signal flow 1160 of FIG. 11.

After the UE 1252 successfully registers with the CN 114 (not shown), the (R)AN node 84 sends a control message along the tunnel corresponding to the UL TEID to the UPF 86 to provide it with information about the UE 1252, including a UE ID (including, without limitation, the SUPI, 5G-GUTI and/or GPSI), the UE group ID, shared PDU session ID and/or information about the location of the UE 1252 (including, without limitation, the (R)AN address and/or DL TEID). It is expected that the UPF 86 already has some context information about the UE 1252 and/or the UE group from signal flow 1175 in FIG. 11.

Since it is assumed that the DL UP connection also employs the shared PDU session, by way of non-limiting example, because of lack of mobility of the UE 1252, the (R)AN node 84 also notifies the UPF 86 of the shared DL TEID.

If, however, the DL TEID of the shared PDU session is not to be used for the UE 1252, the (R)AN node 84 may assign a DL TEID dedicated to the UE 1252 and may notify the UPF 86 of such DL TEID instead of the shared DL TEID. In such a scenario, the DL tunnel associated with the DL TEID is not shared. In any event, the UL tunnel associated with the UL TEID may continue to be shared by the shared PDU session.

After receiving the control information from the (R)AN 84, the UPF 86 may send an acknowledgement message to the (R)AN 84. The message may include a dedicated UL TEID if the UE 1252 is assigned a dedicated DL TEID.

The (R)AN node 84 also sends a radio reconfiguration control (RRC) configuration message over the air interface to notify the UE 1252 about the data radio bearer (DRB) used for the UL and DL transmission.

The figure shows communications between the UE 1252, the (R)AN node 84, a new AMF 1290 and an old AMF 90, the PCF 100, the SMF 92, the AUSF 94, the UDM 102, an equipment identity register (EIR) 1200, an non-3GPP interworking function (N3IWF) 1205 and at least one UPF 86.

The binding of a UE 1252 of a UE group to an established PDU session in accordance with the method of FIG. 12 is initiated by the UE 1252 sending 1210 an access node (AN) registration request. By way of non-limiting example, it is assumed that the UEs 1252 of the UE group are of a common device class.

The message parameters of the AN registration request 1210 may comprise AN parameters, registration management (RM)— non-access stratum (NAS) registration request parameters and may include the UE device class.

The RM-NAS registration parameters may comprise one or more of a registration type, the SUPI and/or the 5G-GUTI, last visited tracking area identity (TAI), security parameters, NSSAI, UE 5G CN (5GC) capability, PDU session status, PDU session(s) to be re-activated, follow-on request and/or mobile-initiated communications only (MICO) mode preference.

If the (R)AN node 84 is a next generation (NG)—RAN, the AN parameters may comprise an "establishment cause" that provides the reason for requesting the establishment of an RRC connection, the SUPI, the 5G-GUTI, the selected network, and NSSAI and in the case of a shared PDU session, the UE device class.

The registration type indicates whether the UE wants to perform an initial registration (that is, the UE 1252 is in a RM-DEREGISTERED state), a mobility registration update (that is, the UE is in a registered state and initiates a registration procedure due to mobility), or a periodic registration update (that is, the UE 1252 is in a registered state and initiates a registration produce due to expiry of a periodic update timer according to TS 23.502 V1.2.0 and clause 4.2.2.2.1 thereof).

The 5G-GUTI indicates the last serving AMF 90. However, if the UE 1252 was previously registered using a non-3GPP access in a PLMN that is different from the new PLMN (that is, not either the registered PLMN or a PLMN that is equivalent thereto) of the 3GPP access, the UE 1252 does not provide, over the 3GPP access, the 5G-GUTI allocated by the AMF 90 during a registration procedure that took place over the non-3GPP access. If the UE 1252 was previously registered using a 3GPP access in the registered PLMN that is different from the new PLMN of the non-3GPP access, the UE 1252 does not provide, over the non-3GPP access, the 5G-GUTI allocated by the AMF 90 during a registration procedure that took place over the 3GPP access.

The UE 1252 may provide a UE usage setting based on its configuration as defined in TS 23.502, including without limitation, (in the case of a shared PDU session) clause 5.16.3.x thereof.

The last visited TAI, if included, assists the AMF 90 produce a registration area for the UE 1252.

The security parameters, if included, may be used for authentication and integrity protection.

The NSSAI, if included, may indicate the NSSAI as defined in TS 23.501, and clause 5.15 thereof.

The PDU session status, if included, may indicate previously established PDU session(s) in the UE 1252.

The PDU sessions to be re-activated, if included, indicate the PDU session(s) for which the UE 1252 intends to activate UP connections.

The follow-on request, if included, indicates that the UE 1252 has pending UL signalling and the UE 1252 has not included PDU session(s) to be re-activated.

The UE device class indicates the capabilities of the UE 1252, in order to assist the (R)AN node 84 to select a pre-configured AMF 90 and/or to assist the AMF 90 to select a pre-configured SMF 92 and/or NSSF 1105. The (R)AN 84 may use the device class to associate the UE 1252 with an existing shared PDU session.

If a SUPI is included and/or if the 5G-GUTI does not indicate a valid AMF 90, the (R)AN node 84 selects 1211 an AMF 90 based on (radio) access technology ((R)AT) and/or NSSAI, in accordance with the procedure described in TS 23.501, clause 6.3.5 thereof and/or, in the case of a shared PDU session, the UE device class.

Alternatively, the (R)AN node 84 simply forwards 1212 the registration request 1210 along the N2 communications link coupling them in an N2 message to an AMF 90 that has been configured, in the (R)AN node 84, to perform the selection of a "new" AMF 1290.

The message parameters of the forwarded registration request 1212 may comprise N2 parameters, an RM-NAS registration request, registration type, security parameters, NSSAI and/or MICO mode preference.

If the (R)AN node 84 is a next generation (NG)—RAN, the N2 parameters may comprise the establishment cause, location information, cell identity and/or a RAT type corresponding to a cell in which the UE 1252 is camping.

If the registration type reflects a periodic registration update, then signal flows 1215 through 1265 are performed. If not, processing proceeds directly to signal flow 1270. If the new AMF 1290 has already received the context information of the specified UE 1252 from the old AMF 90 during a prior handover procedure, signal flows 1215, 1216 and 1230 may be omitted.

If the 5G-GUTI of the UE 1252 was included in signal flow 1210 and the serving AMF 90 has changed since the previous registration of this UE 1252, the new AMF 1290 sends 1215 a Namf communication to request a UE context transfer to the old AMF 90 to request the SUPI and mobility management (MM) context therefrom in accordance with TS 23.502 and clause 5.2.2.2.2 thereof. One parameter of the Namf communication 1215 to request a UE context transfer is an indication that the request is a complete registration request information element (IE), which may be integrity protected, and is used to verify if the context transfer request 1215 corresponds to the specified UE 1252.

In accordance with the context transfer request 1215, the old AMF 90 transfers 1216 event subscription information by each consumer NF for the specified UE 1252, to the new AMF 1290. Once the UE 1252 is successfully registered with the new AMF 1290, the consumer NFs do not re-subscribe for events with the new AMF 1290. The transfer 1216 may also comprise the SUPI and/or MM context of the specified UE 1252 and/or, if it holds information about established PDU sessions, information from the SMF 92 about SMF identities and/or PDU session identities.

Further, if the old AMF 90 holds information about active NGAP UE-TNLA-bindings to the N3IWF 1205, the old AMF 90 includes information about them to the new AMF 1290 in signal flow 1216. The NGAP UE-TNLA-binding binds an NGAP UE association to a specific TNL association for a given UE 1252. The NGAP UE association is the logical per-UE association between a 5G-AN node and the AMF 90.

If the UE 1252 did not supply the SUPI in signal flow 1210, and the old AMF 90 did not provide the SUPI to the new AMF 1290 in signal flow 1216, the new AMF 1290 sends 1220 an identity request to obtain the SUPI from the UE 1251 and the UE 1252 provides 1221 an identity response in response thereto that includes the SUPI.

The new AMF 1290 may decide to initiate authentication of the UE 1252 by invoking an AUSF 94. If so, the new AMF 1290 selects 1222 an AUSF 94 based on the SUPI of the UE 1252, in accordance with TS 23.501 and clause 6.3.4 thereof.

The selected AUSF 94 performs 1225 authentication on the specified UE 1252, in accordance with TS 23.502, using a UDM 102 that the AUSF 94 discovers in accordance with TS 23.501 and clause 6.3.8 thereof. If network slicing has been employed, the new AMF 1290 decides if the registration request 1210 should be rerouted to another AMF 90, in accordance with TS 23.502, clause 4.2.2.2.3 thereof, where the "initial" AMF is the new AMF 1290.

The new AMF 1290 initiates 1227 NAS security functions, in accordance with TS 23.502.

If the authentication 1225 and/or the security functions 1227 failed, the registration request 1210 shall be rejected in signal flow 1280 and the new AMF 1290 notifies 1230 the old AMF 90 that the registration of the UE 1252 in the new AMF 1290 has been rejected completed in accordance with TS 23.502 and clause 5.2.2.2.3 thereof and the old AMF 90 continues as if the Namf communication 1215 was never received.

If the new AMF 1290 has already received the context information of the specified UE 1252 from the old AMF 90 during a prior handover procedure, the new AMF 1290 thereafter notifies 1230 the old AMF 90 that the registration of the UE 1252 in the new AMF 1290 has been completed in accordance with TS 23.502 and clause 5.2.2.2.3 thereof.

If the UE 1252 did not supply the PEI in signal flow 1210 and the old AMF 90 did not provide the PEI to the new AMF 1290 in signal flow 1216, the new AMF 1290 sends 1235 an identity request to obtain the PEI from the UE 1251 and the UE 1252 provides an identity response in response thereto that includes the PEI.

Once in possession with the PEI, the new AMF 1290 requests 1240 a mobile equipment (ME) identity check from the EIR 1200, in accordance with TS 23.501 and clause 4.7 thereof and receives 1241 a response thereto.

If the AMF 90 has changed since the last registration request by the UE 1252 and/or if the SUPI corresponding to the UE 1252 does not refer to a valid context in the new AMF 1290 and/or if the UE 1252 is registering to the same new AMF 1290 to which it had previously registered for a non-3GPP access, the new AMF 1290 proceeds 1250 with registering the UE 1252 with a UDM 102 and subscribing to be notified when the UDM 102 deregisters the new AMF 1290.

The new AMF 1290 provides the UDM 102 with the AT that it serves for the UE 1252 and sets the AT to "3GPP access". The UDM 102 stores the updated AT together with an identification of the serving AMF 1290.

Prior to registering with the UDM 102, the new AMF 1290 selects 1245 a UDM 102 based on the SUPI in accordance with TS 23.501 and clause 6.3.8 thereof and/or the UE device class.

The new AMF 1290 retrieves 1251 mobility-related subscription data from the UDM 102, creates an MM context therefrom for the UE 1252 and subscribes to be notified when it is determined that the subscription data has been modified.

The subscription data may comprise the UE device class and/or the UE group ID, which may comprise the UE ID (including, without limitation, the SUPI and/or GPSI) of the UE 1252 and/or UE IDs (including, without limitation, the SUPI and/or GPSI) of other UEs having a common UE group ID. The UE group ID indicates that the UEs corresponding thereto may have common network control policies, such as, without limitation, access, mobility, and/or QoS policies. If the UE group context does not exist, the new AMF 1290 creates one for the UE group.

When the selected UDM 102 has stored the associated AT together with the identification of the serving AMF 1290, the UDM 102 notifies 1253 the old AMF 90 that it has de-registered its UE context management, if one existed. The old AMF 90 removes the MM context of the UE 1252. If the reason indicated by the UDM 102 in the notification 1253 for the de-registration is that this is an initial registration, the old AMF 90 sends a Namf event exposure notification (not shown) to all of the associated SMFs 92 of the UE 1252 that the UE 122 has been de-registered from the old AMF 90 and the SMFs 92 will release the PDU session(s) accordingly.

In some examples, the new AMF 1290 selects 1255 a PCF 100 based on the SUPI of the UE 1252 in accordance with TS 23.501.

If the new AMF 1290 has not yet obtained an access and mobility policy for the UE 1252 and/or if the access and mobility policy in the new AMF 1290 is no longer valid and/or, if the access and mobility policy of the UE group associated with the UE 1252 is already known to the new AMF 1290, the new AMF 1290 sends 1260 a Nudm policy control creation request to the PCF 100 to apply operator policies for the UE 1252 in accordance with TS 23.502 and clause 5.2.5.2.2 thereof. If the UE 1252 is roaming, there may be interaction between a home PCF (H-PCF) and a visiting PCF (V-PCF) in order to establish the access and mobility policy. The PCF 100 provides 1261 to the new AMF 1290, the access and mobility policy for the UE 1252.

If the AMF 90 has changed since the last registration request by the UE 1252 and/or if the PDU session status in the registration request 1210 indicates that the PDU session has been released at the UE 1252 and/or if the PDU session status in the registration request 1210 indicates that the PDU session is to be reactivated, the new AMF 1290 sends a message 1265 to each SMF 92.

It is assumed that the old AMF 90 has previously provided the identity of each SMF 92 to the new AMF 1290.

If the triggering event is that the AMF 90 has changed, the message 1265 is an Namf event exposure notification with the reachability status of the UE 1252 that indicates the new AMF 1290 is serving the UE 1252 in accordance with TS 23.502 and clause 5.2.2.3 4 thereof. In particular, without limitation:

if the UE 1252 was in MICO mode and the old AMF 90 had notified an SMF 92 that the UE 1252 was unreachable as a result, provided that the SMF 92 does not need to send DL data notifications to the new AMF 1290, the new AMF 1290 informs the SMF 1252 that the UE 1252 is reachable and will notify any NFs that subscribed to UE reachability of the change in UE reachability;

if the old AMF 90 had notified an SMF 92 that the UE 1252 was reachable only for regulatory prioritized service and the UE 1252 has entered into an Allowed area, the new AMF 1290 informs the SMF 92 that the UE 1252 is reachable and will notify any NFs that subscribed to UE reachability of the change in UE reachability; and if the new AMF 1290 detects that the UE 1252 has moved out of the area of interest and an SMF has subscribed to notifications of a UE location change relative to an area of interest, the new AMF 1290 informs the SMF 92 of the new location information of the UE 1252 by an Namf event exposure notification (not shown).

If the triggering event is that the PDU session status indicates that the PDU session has been released at the UE 1252, the message 1265 is an Nsmf PDU session release SM context message in accordance with TS 23.502 and clause 5.2.8 thereof to release any network resources related to the PDU session.

If the triggering event is that the PDU session status indicates that the PDU session is to be re-activated, the message 1265 is an Nsmf PDU session update SM context message in accordance with TS 23.502 and clause 5.2.8.2.6 thereof. Steps 4 through 8 of TS 23.502 and clause 4.2.3.3 thereof are executed to complete a UP connection activation without sending a MM NAS service accept notification from the new AMF 1290 to the (R)AN node 84. In particular, without limitation, if the UE 1252 is in a Non-allowed area, and the PDU session(s) to be re-activated is included in the registration request 1210, the new AMF 1290 informs all SMFs 92 associated therewith that the UE 1252 is only reachable for regulatory prioritized service and will notify any NFs that subscribed to UE reachability of the change in UE reachability.

In some examples, the SMF 92 may decide to trigger a relocation of a UPF 86 and/or the insertion of an intermediate UPF 86 in response thereto, in accordance with TS 23.502 and clause 4.2.3.2 thereof.

Where the new AMF 1290 is different from the old AMF 90 (that is, the serving AMF 90 has changed since the last registration), the new AMF 1290 waits until the messages 1265 to the SMF(s) 92 have been sent before proceeding. Otherwise, signal flows 1270 through 1281 may proceed in parallel therewith.

The new AMF 1290 may decide to send 1270 an N2 request to the N3IWF 1205 to modify the NGAP-UE-TNLA binding in accordance with TS 23.502 and clause 4.2.7.2, in case the serving AMF 90 has changed and the old AMF 90 has existing NGAP-UE-TNLA bindings for the UE 1252 with the N3IWF 1205. The N3IFW 1205 may send 1271 a response thereto.

If the old AMF 90 previously requested that the context of the UE 1252 be established in the PCF 100, the old AMF 90 terminates such context in the PCF 100 by sending 1275 an Npcf AM policy control delete message and the PCF 100 may send 1276 a response thereto. It will be appreciated that if the registration type indicated in the registration request 1210 was for a periodic registration update, signal flows 1275 and 1276 may be omitted.

The new AMF 1290 sends 1280 a registration accepted message to the UE 1252. If the new AMF 1290 has allocated a new 5G-GUTI, this may be provided as a parameter in the message 1280. The message 1280 includes the mobility restrictions in case they apply to the UE 1252. The message also returns as a parameter, a PDU session status that indicates the established PDU sessions to the UE 1252 and an NSSAI parameter that includes the allowed S-NSSAI(s).

The UE 1252 locally removes any internal resources related to PDU sessions that are not indicated as having been established in the message 1280, even if the UE 1252 requested their establishment and has not previously received a SMF response thereto.

If the registration request 1210 included a PDU session status, the new AMF 1290 returns a PDU session status in the message 1280.

If the new AMF 1290 has allocated a new registration area, this may be provided as a parameter in the message 1280. If no registration area is provided in the message 1280, the UE 1280 assumes that the previous registration area remains valid.

If the UE subscription data from the signal flow 1251 includes LADN identification information, the new AMF 1290 returns LADN information for LADNs identified in TS 23.501 and clause 5.6.5 thereof, as a parameter in the message 1280, that are available within the registration area determined by the new AMF 1290 for the UE 1252.

If the registration request 1210 included a MICO mode, the new AMF 1290 returns as a parameter in the message 1280 an indication whether MICO mode should be used.

Moreover, the new AMF 1290 returns as a parameter in the message 1280 an indication of whether IP multimedia subsystem (IMS) Voice over packet switch (PS) is supported, in accordance with TS 23.501 and clause 5.16.3.2 thereof. In order to provide this indication, the new AMF 1290 may perform a UE/RAN radio information and compatibility request procedure in accordance with TS 23.501 and clause 4.2.8 thereof. If the new AMF 1290 has not received a timely voice support match indicator from the NG-Ran, in some examples, the new AMF 1290 may set a default indication and update it at a later stage.

The UE 1252 sends 1281 a registration complete message to the new AMF 1290. If a new 5G-GUTI was assigned in message 1280, this will acknowledge the assignment thereof.

If the registration request 1210 does not include a PDU session to be reactivated indication, the new AMF 1290 releases the signalling connection with the UE 1252 after receiving the message 1281.

If the registration request 1210 includes a follow-on request, the new AMF 1290 does not release the signalling connection with the UE 1252 immediately after receiving the message 1281.

If the new AMF 1290 tries to bind the UE 1252 with a shared PDU session, the new AMF 1290 sends 1285 a shared PDU session binding request to the (R)AN node 84. The message 1285 may contain, as parameters, the UE group ID and/or the shared PDU session ID, an indication to request that the (R)AN node 84 assign a dedicated DL TEID or an existing shared DL TEID to the UE 1252 for an N3 communication link coupling the (R)AN node 84 and the UPF 86.

In the case of a shared PDU session, the (R)AN node 84 performs 1286 an RRC reconfiguration with the UE 1252 to assign a new or an existing data radio bearer (DRB) in both the UL and DL for the UE 1252.

In the case of a shared PDU session, the (R)AN node 84 response 1287 to the new AMF 1290 in response to message 1285.

In the case of a shared PDU session, the (R)AN node 84 sends 1291 a control message to the UPF 86 along the N3 shared tunnel of the UE group, to notify the UPF 86 of information about the UE 1252. Such information may, in some examples, include one or more parameters, such as the UE ID (including, without limitation, the SUPI, 5G-GUTI and/or GPSI), (R)AN information (including, without limitation, the (R)AN address and/or DL TEID), the UE group ID and/or the shared PDU session ID.

In the case of a shared PDU session, if only the UL UP tunnel is shared, the (R)AN node 84 may include as a parameter in the control message 1291, a DL TEID unique to the UE 1252.

In the case of a shared PDU session, the UPF 86 stores the information about the UE 1252 in the UE group context.

In the case of a shared PDU session, it is assumed that the UPF 86 already has obtained during the establishment of the shared PDU session described in FIG. 11, policy control information which may comprise PCC rules (including, without limitation, QoS parameters, charging and/or traffic steering information).

In the case of a shared PDU session, the new AMF 1290 may send 1292 to the SMF(s) 92, a message indicating the location of the UE 1252 whereupon the SMF 92 may update the location information thus obtained. The SMF 92 may send a response message (not shown) to the AMF 90 to acknowledge the UE location update message 1292.

Figure 13:
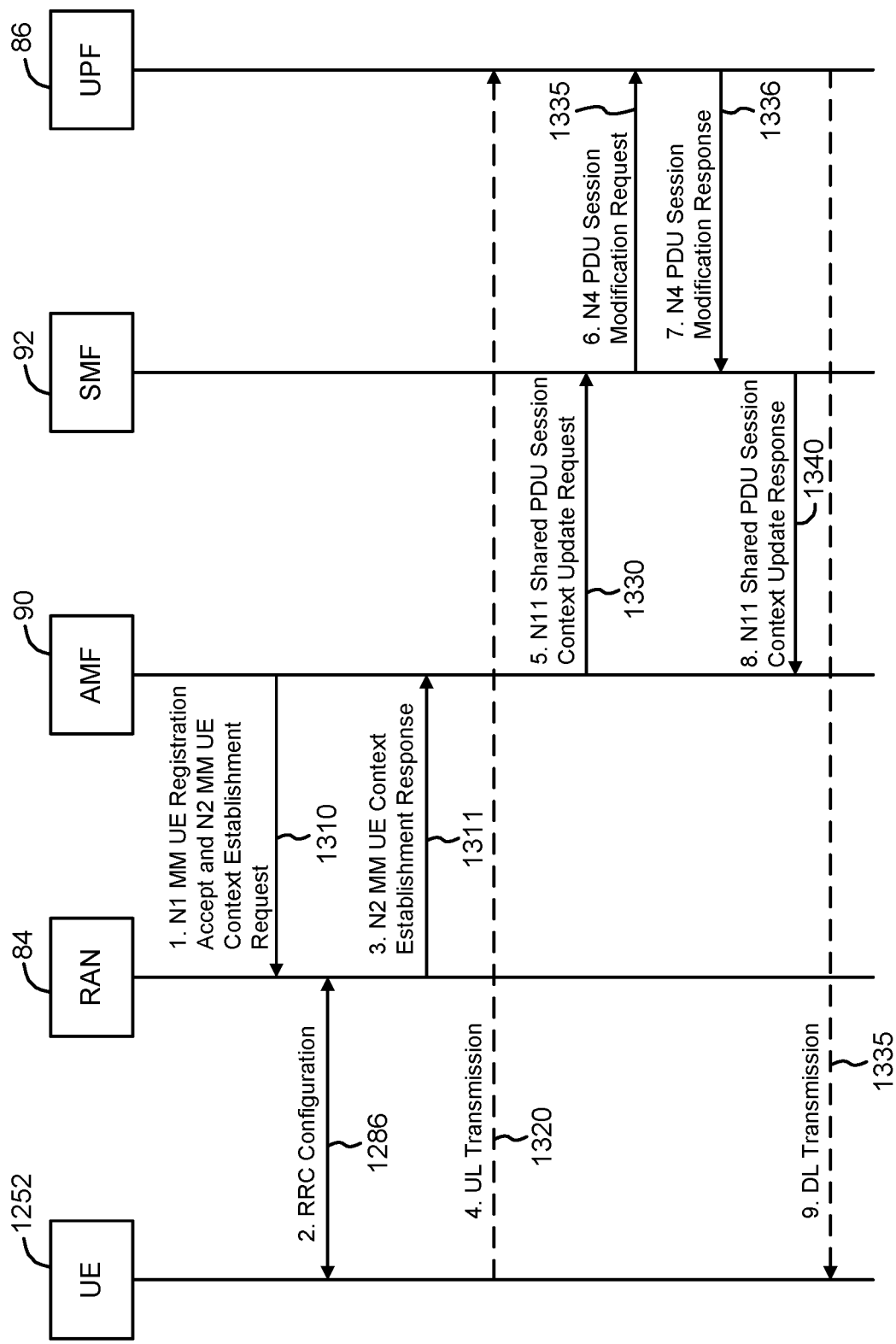
FIG. 13 is a signal flow diagram showing example signal flows to cause the AMF to bind a UE that has registered with the CN with the shared PDU session of FIG. 11 according to an example.

One example method of binding a UE 1252 that has registered with the CN 114 involves the AMF 90 binding the UE 1252 with the shared PDU session established in FIG. 11, as shown in FIG. 13. The method of FIG. 13 is aligned with the design principle of 5G CNs 1114 that the CP and UP be designed separately.

In this example, the AMF 90 requests the (R)AN node 74 to establish a UE context in the (R)AN node 84 to associate the UE 1252 with the shared PDU session. In some non-limiting examples, the UE context may form part or may comprise the context for the UE group with which the UE 1252 is associated.

Alternatively the AMF 90 informs the SMF 92 about the UE 1252. The SMF 92 then requests the (R)AN node 84 to associate the UE 1252 with the shared PDU session. The AMF 90 also requests the SMF 92 to establish the UE context in the UPF(s) 86. This allows the SMF 92 to update the UPF(s) 86 associated with the UE 1252 with UE location information, including without limitation, the (R)AN address and DL TEID.

It is conceivable that none, one or both of the UL UP connection and the DL UP for the UE 1252 employ(s) the shared tunnel.

In some examples, the UL UP connection for the UE 1252 employs a unique UL TEID and the DL UP connection employs a shared DL TEID. In such a case, the SMF 92 generates a new UL TEID that it sends to the (R)AN node 84.

The DL UP connection for the UE 1252 may employ a shared DL TEID or may employ a unique DL TEID, by way of non-limiting example, in the scenario where the UE 1252 is geographically mobile. In the former case, the (R)AN node 84 associates the UE 1252 using an existing shared DL TEID. In the latter case, the (R)AN node 84 generates a new DL TEID that it sends to the SMF 92.

The figure shows communications between the UE 1252, the (R)AN node 84, the AMF 90, the SMF 92 and the UPF 86.

After the UE 1252 successfully registers with the CN 114 (not shown), the AMF 90 sends 1310 to the (R)AN node 84 an MM UE registration accept message intended for the UE 1252 along the logical N1 communications link coupling the AMF 90 and the UE 1252 and sends the (R)AN node 84 an MM UE context establishment message to establish a UE context for the UE 1252 along the N2 communications link coupling the AMF 90 and the (R)AN node 84. The MM UE context establishment message 1310 may comprise as parameters thereof, without limitation, the UE device class, the 5G-GUTI, the S-NSSAI, the UE group ID and/or security information. The message 1310 may include the (common) SM message that the AMF 90 received from the SMF 92 for forwarding to the UE 1252 along the logical N1 communication link coupling the UE 1252 and the AMF 90 during the establishment of the shared PDU session described in FIG. 11.

If a UE group context has been created by the establishment of the shared PDU session in the method of FIG. 11, the (R)AN node 84 may associate the UE 1252 with such UE group context. The UE group context may comprise a pre-configured N3 shared tunnel with corresponding UL and DL TEIDs, none, or one, or both of which will be employed with the UE 1252. In some examples, the UE 1252 will not employ the UL TEID of the N3 shared tunnel corresponding to the shared PDU session. Rather, the (R)AN node 84 will generate a unique UL TEID for the UE 1252 to use in a shared PDU session. In some examples, including without limitation, where the UE 1252 is geographically mobile, the UE 1252 will not employ the DL TEID of the N3 shared tunnel corresponding to the shared PDU session. Rather, the AMF 90 will request the (R)AN node 84 to create a unique DL TEID for the UE 1252 to use in a shared PDU session.

The (R)AN node 84 performs 1286 an RRC (re)configuration procedure with the UE 1252 to assign a DRB in both the UL and DL for the UE 1252. The security information received by the (R)AN node 84 from the AMF 90 in signal flow 1310 is also forwarded to the UE 1252. The (R)AN node 84 may forward to the UE 1252 along the N1 logical communications link, any SM message and MM message that it received from the AMF 90 in message 1310.

The (R)AN node 84 sends 1311 an MM UE context establishment response message to the AMF 90 along the N2 communications link coupling the AMF 90 and the (R)AN node 84 in response to the MM UE context establishment request message 1310. If the UE 1252 does not employ the shared UL TEID, such response may include the unique UL TEID generated by the (R)AN node 84.

Thereafter, the UE 1252 may send 1320 one or more UL packets to the UPF(s) 86 associated therewith using the UL TEID established for it.

The AMF 90 sends 1330 a Shared PDU session context update request to the SMF 92 along the N11 communications link coupling the AMF 90 and the SMF 92. The Shared PDU session context update request message 1330 may comprise as parameters thereof, without limitation, network slice information (including, without limitation, the S-NSSAI), the shared PDU session ID, the UE ID (such as, without limitation, the SUPI, 5G-GUTI and/or GPSI), the UE device class and/or UE location information (including, without limitation, the (R)AN address and the unique DL TEID if appropriate).

The SMF 92 sends 1335 a PDU session modification request message to the UPF(s) 86 along the N4 communications link coupling the SMF 92 and the UPF(s) 86. The PDU session modification request message 1335 may comprise as parameters thereof, without limitation, (R)AN tunnel information (including, without limitation, the (R)AN address and the DL TEID), the UE identifier and/or the shared PDU session ID.

In some examples, where the PDU session is of an unstructured data type, the SMF 92 assigns an IP address and/or IP prefix for an IP tunnel along the N6 communications link coupling the UPF(s) 86 and the DN 88 to carry the UL packets.

In some examples, where the PDU session is of an IP data type, the SMF 92 may include the IP address(es) and/or IP prefix(es) of the UE 1252 as part of a packet filter description. If the SMF 92 responsible for generating the UL TEID and the UE 1252 is assigned a separate UL TEID, it may include such new UL TEID.

The UPF(s) 86 send(s) 1336 a PDU session modification response message to the SMF 92 along the N4 communications link coupling the SMF 92 and the UPF(s) 86 in response to the PDU session modification request message 1335. If the UPF 86 is responsible for generating the UL TEID, the UPF 86 may generate a new UL TEID.

The SMF 92 sends 1340 a Shared PDU session context update response message to the AMF 90 along the N11 communications link coupling the AMF 90 and the SMF 92 in response to the Shared PDU session context update request message 1330.

In some examples, the SMF 92 may include in message 1340 an SM session modification request to be sent to the (R)AN node 84 along the N2 communications link coupling the AMF 90 and the (R)AN node 84. Such message may include the new UL TEID for the UE 1252, the shared PDU session ID, the UE group ID, and/or in some examples, the QoS profile update and/or the QFI for the UL TEID of the UE 1252. The AMF 90 forwards (not shown) the SM session modification request to the (R)AN 84 along the N2 communications link coupling the AMF 90 and the (R)AN node 84. The (R)AN 84 then sends an SM session modification response (not shown) to the SMF 92 via the AMF 90 along the N2 communications link coupling the AMF 90 and the (R)AN node 84.

In some examples, the SMF 92 may include in message 1340 an SM message for forwarding to the UE 1252 along a logical N1 communications link coupling the UE 1252 and the AMF 90. The message may include the IP address(es) and/or IP prefix(es) for the UE 1252 to send IP packets to the DNN (if the shared PDU session is of an IP data type). The message may include one or some following parameters: QoS rules and QFI(s), and shared PDU session ID. The AMF 90 shall forward (not shown in FIG. 13) the N1 SM message to the (R)AN 84. The (R)AN 84 then sends an N1 SM message (not shown in FIG. 13) to UE 1252. The UE sends an N2 SM message (now shown in FIG. 13) to response for the N1 SM message, to the SMF 92 via the (R)AN 84 and the AMF 90.

Thereafter, the UPF(s) 86 may send 1345 one or more DL packets to the UE 1252 associated therewith using the DL TEID established for it.

Figure 14:
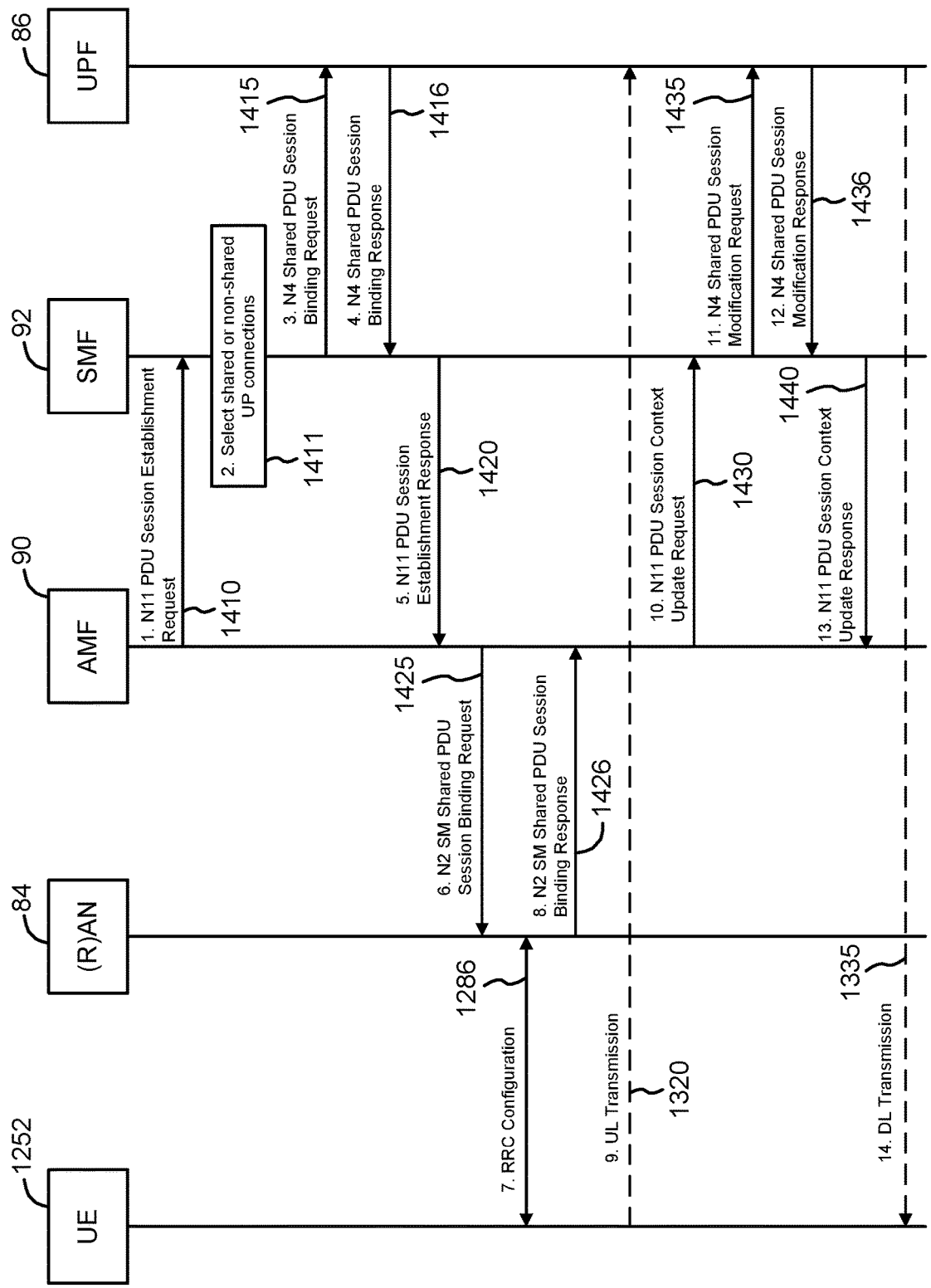
FIG. 14 is a signal flow diagram showing example flows to cause the SMF to bind a UE that has registered with the CN with the shared PDU session of FIG. 11, according to an example.

One example method of binding a UE 1252 that has registered with the CN 114 involves the SMF 92 binding the UE 1252 with the shared PDU session established in FIG. 11, as shown in FIG. 14.

In this example, the AMF 90 requests the SMF 92 to establish a PDU session for the UE 1252. The AMF 90 may do so if it has received a request from the UE 1252 to establish a PDU session. Alternatively, the AMF 90 may automatically send such a request to the SMF 92 when the UE 1252 has registered with the CN 114.

In some examples, the SMF 92 may decide to associate the UE 1252 with the shared PDU session established in FIG. 11, if the SMF 92 decides that none, one, or both of the UL UP connection and the DL UP connection for the UE 1252 will employ the shared tunnel. Such determination may depend on a number of factors, including, without limitation, information from the AMF 90 about the geographic mobility of the UE 1252 and/or the charging policy employed by UEs associated with the UE group corresponding to the shared PDU session.

If the SMF 92 determines to associate the UE 1252 with the shared PDU session, the (R)AN node 84 associates the UE 1252 with the existing shared PDU session. If the DL UP connection is not shared (but the UL UP connection is shared), the (R)AN node 84 creates a new unique DL TEID and sends it to the SMF 92.

The figure shows communications between the UE 1252, the (R)AN node 84, the AMF 90, the SMF 92 and the UPF 86.

After the UE 1252 successfully registers with the CN 114 (not shown), the AMF 90 sends 1410 a PDU session establishment request to the SMF 92 along the N11 communications link coupling the AMF 90 and the SMF 92. The AMF 90 sends this message 1410 when it has received a request from the UE 1252 to establish a PDU session and/or automatically after the UE 1252 has registered with the CN 114 (not shown).

The PDU session establishment request 1410 may comprise, as parameters thereof, without limitation, the UE ID (including, without limitation, the SUR), the UE group ID, the S-NSSAI, the UE device class, the UE location (including, without limitation, the (R)AN address) and/or mobility information. The mobility information supports the selection 1411 by the SMF 92 of shared and/or unique UP connections in the UL and DL. Provided that the SMF 92 determines that one (if not both) of the UL and DL connections are to be shared, the mechanism of FIG. 14, which involves the binding of the UE 1252 to a previously-established shared PDU session is invoked.

The SMF 92 makes 1411 the determination (whether to use the shared or separate tunnel(s) for UL and/or DL connections) based on information, which may include, without limitation:

information about the geographic mobility (including without limitation, a UE mobility pattern parameter) of the UE 1252 obtained from the AMF 90 (not shown in FIG. 14) and/or the UDM 102: if the UE 1252 is mobile, it may not be appropriate to share one or both of the UL and DL UP connections;

the charging policy of the UE group with which the UE 1252 is associated: if charging is applied to the UE group as a whole and not to individual UEs 1252, it may be appropriate to share one or both of the UL and DL UP connections; and QoS policy: if the MBR control is applied to individual UEs 1252 as opposed to the UE group as a whole, it may not be appropriate to share one or both of the UL and DL UP connections.

Provided that the determination 1411 is that one or both of the UL and DL UP connections are to be shared, the SMF 92 sends 1415 a shared PDU session binding request (and/or shared PDU session modification request) message to the UPF(s) 86 associated with the UE 1252 along the N4 communication link coupling the SMF 92 and the UPF(s) 86. The Shared PDU session binding request message 1415 may comprise, without limitation, the UE ID (including, without limitation, the SUPI, 5G-GUTI, and/or GPSI), UE Group ID, shared PDU session Id, the UE location information (including, without limitation, the (R)AN address and/or DL TEID) and/or, if the SMF 92 is responsible for generating the UL TEID, such new UL TEID.

If the DL UP connection along the N3 communications link coupling the (R)AN node 84 and the UPF(s) 86 is shared, the DL TEID is the shared DL TEID of the shared PDU session established in FIG. 11. Otherwise, the SMF 92 requests the (R)AN node 84 to generate and send it a unique DL TEID as part of the PDU session establishment response message 1420.

If the UL UP connection along the N3 communications link coupling the (R)AN node 84 and the UPF(s) 86 is shared, the UL TEID is the shared UL TEID of the shared PDU session established in FIG. 11. Otherwise, the SMF 92 may generate a new unique UL TEID and send it to the UPF 86. The SMF 92 may locally store the QoS policy and/or the charging policy for local QoS flows sent over the N3 tunnel coupling the (R)AN node 84 and the UPF 86. If the PCC rules (including without limitation QoS policy and/or charging policy) are not already stored in the UPF(s) 86, or the PCC rules are to be updated, the SMF 92 sends them to the UPF(s) 86 as parameters. If the shared PDU session is of an unstructured data type, the SMF 92 may assign unique IP address(es) and/or IP prefix(es) to be used to send UL packets of the UE 1252 over the N6 communications link coupling the UPF 86 and the DN 88. If the shared PDU session is of an IP data type, the SMF 92 may assign unique IP address(es) and/or IP prefix(es) for the UE 1252 and send this information to the UPF 84 as part of a packet filter description of QoS rules.

The UPF(s) 86 send(s) 1416 a Shared PDU session binding response message to the SMF 92 along the N4 communication link coupling the SMF 92 and the UPF(s) 86 in response to the Shared PDU session binding request message 1415. If it has been determined 1411 by the SMF 92 that the UL UP connection is not shared, and the UPF(s) 86 is/are responsible for generating a unique UL TEID, such UL TEID will be a parameter in such message.

The SMF 92 sends 1420 a PDU session establishment response message to the AMF 90 along the N11 communications link coupling the AMF 90 and the SMF 92 in response to the PDU session establishment request message 1410. The PDU session establishment response message 1420 may comprise, without limitation, a SM Shared PDU session binding request message 1425 to be sent to the (R)AN node 84 and/or parameters including without limitation, the UE group ID and/or the shared PDU session ID.

If it has been determined 1411 by the SMF 92 that the UL UP connection is not shared, the unique UL TEID (whether generated by the SMF 92 or UPF(s) 86 as determined by a configuration specified by the NMF 1100) will be a parameter in the SM shared PDU session binding (and/or SM shared PDU session modification) request message 1425 to be sent to the (R)AN node 84 along the N2 communications link coupling the AMF 90 and the (R)AN node 84.

If it has been determined 1411 by the SMF 92 that the DL UP connection is not shared, the SMF 92 also sends an indication to the (R)AN node 84 to generate a unique DL TEID.

In some examples, the (R)AN node 84 may already have a QoS profile for the UE group or a QoS profile for the UE 1252 associated with the UE group. If this is not the case, or if such QoS profile(s) is to be updated, the SMF 92 sends the QoS profile to the (R)AN node 84 in the SM Shared PDU session binding request message 1425.

In some examples, if the shared PDU session is of an IP (IPv4 and/or IPv6) data type, the SMF 92 may send an SM message to the UE 1252 along the logical N1 communications link coupling the AMF 90 and the UE 1252. The message may include the IP address(es) and/or IP prefix(es) assigned to the UE 1252 for the shared PDU session, QoS rules and/or QFI(s) and/or the shared PDU session ID.

The AMF 90 forwards 1425 the SM message (intended to be forwarded to the UE 1252 along the N1 logical communications link coupling the UE 1252 and the AMF 90) and the SM Shared PDU session binding request message to the (R)AN node 84 along the N2 communications link coupling the (R)AN node 84 and the AMF 90.

The (R)AN node 84 performs 1286 an RRC (re)configuration procedure with the UE 1252 to assign a DRB in both the UL and DL for the UE 1252. The (R)AN node 84 may forward the SM message received in signal flow 1425 to the UE 1252 along the logical N1 communications link.

The (R)AN node 84 sends 1426 an SM Shared PDU session binding response message to the AMF 90 along the N2 communications link coupling the (R)AN node 84 and the AMF 90 in response to the SM Shared PDU session binding request message 1425. If it has been determined 1411 by the SMF 92 that the DL UP connection is not shared, the (R)AN node 84 may include a new unique DL TEID in the message 1426.

Thereafter, the UE 1252 may send 1320 one or more UL packets to the UPF(s) 86 associated therewith using the UL TEID established for it.

The AMF 90 sends 1430 a PDU session context update request to the SMF 92 along the N11 communications link coupling the AMF 90 and the SMF 92. The PDU session context update request message 1430 forwards the SM Shared PDU session binding response message 1426 received from the (R)AN node 84.

If it has been determined 1411 by the SMF 92 that the DL UP connection is not shared, the SMF 92 sends 1435 a Shared PDU session modification request message to the UPF(s) 86 along the N4 communications link coupling the SMF 92 and the UPF(s) 86. The Shared PDU session modification request message 1435 may comprise, as parameters thereof, without limitation, the UE group ID, the UE ID, the shared PDU session ID and/or (R)AN tunnel information (including, without limitation the (R)AN ID and/or the DL TEID).

In some examples, where the PDU session is of an unstructured data type, the SMF 92 assigns an IP address and/or IP prefix for an IP tunnel along the N6 communications link coupling the UPF(s) 86 and the DN 88 to carry the UL packets.

If the Shared PDU session binding request message 1415 did not include a PCC rule update (including without limitation, a QoS policy and/or charging policy), the SMF 92 may send new PCC rules to the UPF(s) 86 to update the UE group context and/or the shared PDU session context.

The UPF(s) 86 send(s) 1436 a Shared PDU session modification response message to the SMF 92 along the N4 communications link coupling the SMF 92 and the UPF(s) 86 in response to the Shared PDU session modification request message 1435.

The SMF 92 sends 1440 a PDU session context update response message to the AMF 90 along the N11 communications link coupling the AMF 90 and the SMF 92 in response to the PDU session context update request message 1430.

If the UE 1252 had requested a PDU session of an IP data type, the SMF 92 assigns an IP address and/or IP prefix for an IP tunnel along the logical N1 communications link coupling the UE 1252 as part of signal flow 1420 or in a separate signal flow (not shown), the AMF 90 forwards the SM message to the UE 1252 via the (R)AN 84 along the logical N1 communications link coupling the AMF 90 and the UE 1252. The UE 1252 may send an SM response message (not shown) to the SMF 92 along the logical N1 communications link coupling the UE and the AMF 90.

Thereafter, the UPF(s) 86 may send 1335 one or more DL packets to the UE 1252 associated therewith using the DL TEID established for it.

The foregoing describes methods to bind UEs 1252 with a shared PDU session after registration of the shared PDU session.

In some examples (not shown), the SMF 92 may associate any UEs 1252 of the UE group, which had not been previously associated with a shared PDU session, with a shared PDU session any time thereafter.

In some non-limiting examples, an NF, such as, without limitation, an AMF 90, can select another NF, such as, without limitation, an SMF 92.

In some examples, a plurality of instances of a given type of NF can be grouped as a set of such NFs, such as, without limitation, an AMF set of AMFs 90, as described in 3GPP TS 23.501 and/or a SMF set of SMFs 92. In some examples, each NF set may have a representative NF (R-NF) associated therewith. The R-NF of a NF set may be the interface to another NF set. By way of non-limiting example, the representative SMF 92 (R-SMF) may communicate, on behalf of individual instances of SMFs 92, with the representative AMF 90 R-AMF on behalf of individual instances of AMFs 90. By way of non-limiting example, when an AMF instance wants to select an SMF instance, the AMF instance or indeed, the R-AMF may send a message to the NRF 98 to discover an appropriate SMF set. The NRF 98 may respond to such request to the AMF 90 to identify the SMF set, such as, by way of non-limiting example, providing the address of the SMF set.

Thereafter, the AMF 90 (or R-AMF) may send a message to the SMF set, such as, without limitation, to the address of the SMF set, such as, by non-limiting example, to request shared PDU session establishment.

Upon receipt, the R-SMF of the SMF set may select an SMF instance and send the request received from the AMF to such selected SMF 92. The selected SMF 92 may store the address of the AMF 90 and process the AMF request. The selected SMF 92 may thereafter send a response to the AMF 90, which may, in some non-limiting examples, include the address of the SMF instance. The AMF 90 will store the address of SMF 92 for further communications.

Similarly, instances of other NFs, such as, without limitation, PCFs 100, NEFs 96, UDMs 102 and/or UDRs may be grouped into corresponding sets. Interactions between instances of a NF set with an instance of another NF set may be occur in a similar manner.

In some examples, if a given NF instance is out of service, the R-NF may select another NF instance. By way of non-limiting example, when an SMF instance sends a message to a previously connected AMF instance and this AMF 90 is out of service, the R-AMF may receive the message from the SMF 92 and select a new AMF instance to handle the request. The new AMF 90 may send a response message to the SMF 92, which includes the address of the new AMF 90. The SMF 92 will thereafter send messages to the new AMF 90.

In some examples (not shown), methods to modify or release the shared PDU session may employ methods known to those having ordinary skill in the relevant art that are designed for PDU sessions that are not shared and as described in 3GPP TS 23.502, with appropriate modifications consistent with those that may be described in examples in the present disclosure.

Method Actions

Figure 15:
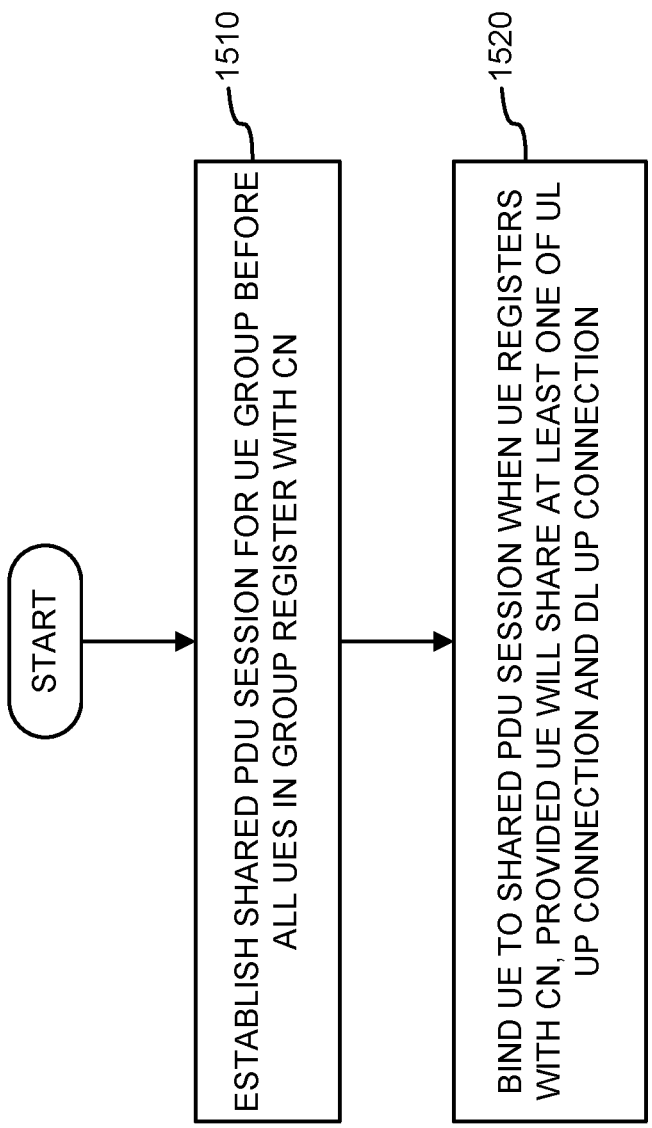
FIG. 15 is a flow chart illustrating a method for associating a UE of a UE group to a PDU session within a CN according to an example.

Turning now to FIG. 15, there is shown a flow chart, shown generally at 1500, of example actions taken to associate a UE of a UE group to a PDU session within a CN 114.

One example action 1510 is to establish a shared PDU session for the UE group before all of the UEs in the UE group have registered with the CN 114.

One example action 1520 is to bind a UE that has not yet registered with the CN 114 to the shared PDU session when the UE registers with the CN 114, provided the UE will share at least one of an UL UP connection and a DL UP connection with the shared PDU session.

Figure 16:
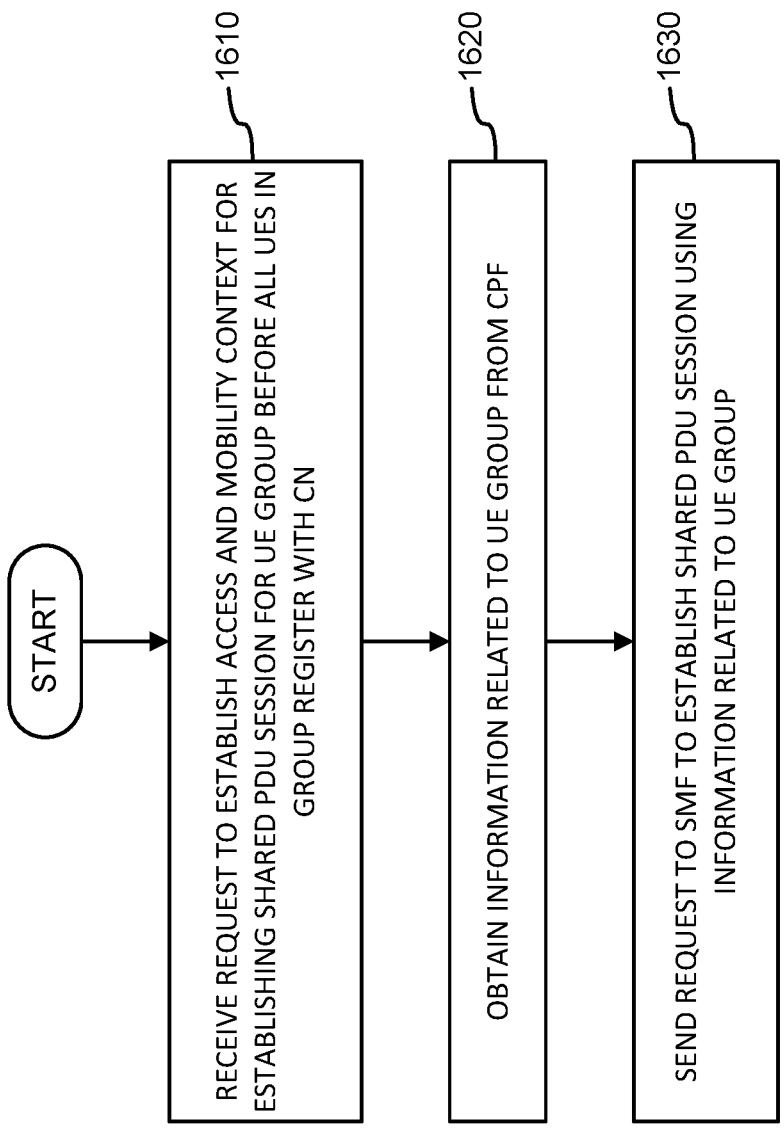
FIG. 16 is a flow chart illustrating a method for associating a UE of a UE group to a PDU session within a CN according to an example.

Turning now to FIG. 16, there is shown a flow chart, shown generally at 1600, of example actions taken to associate a UE of a UE group to a PDU session within a CN 114.

One example action 1610 is to receive a request to establish an access and mobility context for establishing a shared PDU session for the UE group before all of the UEs in the UE group have registered with the CN 114.

One example action 1620 is to obtain information related to the UE group from a CPF in the network.

One example action 1630 is to send a request to an SMF in the network to establish the shared PDU session using the information related to the UE group, whereby the SMF may thereafter bind a UE that has not yet registered with the CN 114 to the shared PDU session when the UE registers with the CN 114, provided the UE will share at least one of an UL UP connection and a DL UP connection with the shared PDU session.

According to a first broad aspect of the present disclosure, there is disclosed a method for associating a UE of a UE group to a PDU session within a CN, comprising actions at an SMF of: establishing a shared PDU session for the UE group before all of the UEs in the group register with the CN; and binding a UE that has not yet registered with the CN to the shared PDU session when the UE registers with the CN, provided the UE will share at least one of an UL UP connection and a DL UP connection associated with the shared PDU session.

In an embodiment, the UEs in the UE group may have a common device class. In an embodiment, the UEs in the UE group may be distinguished by a UE group identifier.

In an embodiment, the action of establishing may comprise creating a shared tunnel for the shared PDU session having a shared UL TEID and a shared DL TEID describing respective endpoints thereof and communicating it to a (R)AN node and a UPF associated with the UEs of the UE group. In an embodiment, the SMF may identify the shared UL TEID and provide it to the (R)AN node and UPF. In an embodiment, the SMF may obtain the shared DL TEID from the (R)AN node and provide it to the UPF.

In an embodiment, the action of binding may comprise requesting the (R)AN node to assign a DRB to the UE.

In an embodiment, the action of binding may comprise the (R)AN node associated with the UE sending a UL packet at the shared UL TEID to the UPF associated with the UE that includes the shared DL TEID under direction of the SMF.

In an embodiment, the action of binding may comprise an AMF requesting an MM UE context to be established for the UE from the (R)AN node associated with the UE and providing the MM UE context to the SMF. In an embodiment, the action of binding may further comprise the SMF forwarding the MM UE context to the UPF associated with the UE.

In an embodiment, the action of binding may comprise the SMF sending a shared PDU session binding request to the (R)AN node associated with the UE and to the UPF associated with the UE.

In an embodiment, the action of binding may comprise the SMF determining whether the UE will share either or both of the UL UP connection and the DL UP connection associated with the shared PDU session.

In an embodiment, the action of binding may comprise the (R)AN node generating a unique DL TEID for use by the UE if the UE will not share the DL UP connection associated with the shared PDU session. In an embodiment, the action of binding may comprise generating a unique UL TEID for use by the UE if the UE will not share the UL UP connection associated with the shared PDU session. In an embodiment, the unique UL TEID may be generated by the SMF. In an embodiment, the unique UL TEID may be generated by the UPF.

According to a second broad aspect of the disclosure, there is disclosed a network function comprising: a processor and a non-transient memory. The non-transient memory is for storing instructions that when executed by the processor, causes the network function to be configured to: establish a shared PDU session within a CN of a UE group before all of the UEs in the UE group register with the CN; and bind a UE that has not yet registered with the CN to the shared PDU session when the UE registers with the CN, provided the UE will share at least one of a UL UP connection and a DL UP connection associated with the shared PDU session.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether optically, electrically, mechanically, chemically, or otherwise.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

GENERAL

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which can be modified by omitting, adding or replacing elements with equivalent functional elements, provides many applicable inventive concepts that may be embodied in a wide variety of specific contexts. The specific embodiments discussed are merely illustrative of specific ways to make and use the concepts disclosed herein, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims:

What is claimed is:

1. A session management function (SMF) comprising:

a processor;

a non-transient memory for storing instructions that when executed by the processor cause the SMF to be configured to:

receive a request for an establishment of a packet data unit (PDU) session from a second UE, if a first UE and the second UE belong to a UE group, select one or more UPF from multiple user plane functions (UPFs) to handle traffic associated with the PDU session of the second UE, wherein each of the multiple UPFs is used to handle traffic associated with an existing PDU session of the first user equipment (UE);

send a configuration to the one or more UPF, wherein the configuration includes a packet detection rule and a packet forwarding action rule for the one or more UPF to handle both the traffic associated with the existing PDU session of the first UE and the traffic associated with the PDU session of the second UE; and receive, from the one or more UPF, a response to the configuration.

2. The SMF according to claim 1, wherein the SMF is further to be configured to:

obtain, from a unified data management function (UDM), UE group data indicating that the first UE and the second UE belong to the UE group; and determine that the first UE and the second UE belong to the UE group according to the obtained UE group data.

3. The SMF according to claim 2, wherein the UE group data indicates a relation between a UE group identifier and both an identifier of the first UE and an identifier of the second UE.

4. The SMF according to claim 3, wherein the UE group data further includes information associated with the UE group, the information includes one or more of PDU session type, data network name (DNN), and single network slice selection assistance information (S-NSSAI).

5. The SMF according to claim 1, wherein the SMF is further to be configured to:
- before the determining step, obtain, from a policy control function (PCF), policy control and charging (PCC) rules associated with the UE group, wherein the PCC rules indicate the packet detection rule and the packet forwarding action rule; and
- select the one or more UPF from the multiple UPFs according to the PCC rules.

6. The SMF according to claim 1, wherein the one or more UPF is associated with at least one tunnel of the existing PDU session of the first UE, the SMF is further to be configured to:
- determine the at least one tunnel of the existing PDU session of the first UE to be a tunnel shared between the existing PDU session of the first UE and the PDU session of the second UE, wherein the tunnel includes one or more of an uplink tunnel or a downlink tunnel.

7. A user plane function (UPF) comprising:
- a processor;
- a non-transient memory for storing instructions that when executed by the processor cause the UPF to be configured to:
  - handle traffic associated with an existing packet data unit (PDU) session of a first user equipment (UE);
  - receive a configuration from a session management function (SMF), wherein the configuration includes a packet detection rule and a packet forwarding action rule for the UPF to handle both the traffic associated with the existing PDU session of the first UE and traffic associated with PDU session of a second UE, wherein the first UE and the second UE belong to a UE group; and
  - send to the SMF a response to the configuration.

8. The UPF according to claim 7, wherein the UPF is further to be configured to:
- create a shared PDU session context comprising the packet detection rule and the packet forwarding action rule in response to the configuration; and
- send the response to the SMF.

9. The UPF according to claim 7, wherein the UPF is associated with at least one tunnel of the existing PDU session of the first UE.

10. A method comprising:
- receiving, by a session management function (SMF), a request for an establishment of a packet data unit (PDU) session from a second UE, if a first UE and the second UE belong to a UE group, select one or more UPF from multiple user plane functions (UPFs) to handle traffic associated with the PDU session of the second UE, wherein each of the multiple UPFs is used to handle traffic associated with an existing PDU session of the first user equipment (UE);
- sending, by the SMF, a configuration to the one or more UPF, wherein the configuration includes a packet detection rule and a packet forwarding action rule for the one or more UPF to handle both the traffic associated with the existing PDU session of the first UE and the traffic associated with the PDU session of the second UE; and
- receiving, by the SMF, a response to the configuration from the one or more UPF.

11. The method according to claim 10, wherein the method further comprising:
- obtaining, by the SMF, UE group data from a unified data management function (UDM), the UE group data indicates that the first UE and the second UE belong to the UE group; and
- determining, by the SMF, that the first UE and the second UE belong to the UE group according to the obtained UE group data.

12. The method according to claim 11, wherein the UE group data indicates a relation between a UE group identifier and both an identifier of the first UE and an identifier of the second UE.

13. The method according to claim 12, wherein the UE group data further includes information associated with the UE group, the information includes one or more of PDU session type, data network name (DNN), and single network slice selection assistance information (S-NSSAI).

14. The method according to claim 10, further comprising:
- before the determining step, obtaining, by the SMF, policy control and charging (PCC) rules associated with the UE group from a policy control function (PCF), wherein the PCC rules indicate the packet detection rule and the packet forwarding action rule; and
- selecting, by the SMF, the one or more UPF from the multiple UPFs according to the PCC rules.

15. The method according to claim 10, wherein the one or more UPF is associated with at least one tunnel of the existing PDU session of the first UE, the method further comprising:
- determining, by the SMF, the at least one tunnel of the existing PDU session of the first UE to be a tunnel shared between the existing PDU session of the first UE and the PDU session of the second UE, wherein the tunnel includes one or more of an uplink tunnel or a downlink tunnel.

16. A method comprising:
- handling, by a user plane function (UPF), traffic associated with an existing packet data unit (PDU) session of a first user equipment (UE);
- receiving, by the UPF, a configuration from a session management function (SMF), wherein the configuration includes a packet detection rule and a packet forwarding action rule for the UPF to handle both the traffic associated with the existing PDU session of the first UE and traffic associated with PDU session of a second UE, wherein the first UE and the second UE belong to a UE group; and
- sending, by the UPF, a response to the configuration to the SMF.

17. The method according to claim 16, further comprising:
- creating, by the UPF, a shared PDU session context comprising the packet detection rule and the packet forwarding action rule in response to the configuration; and
- sending, by the UPF, the response to the SMF.

18. The method according to claim 16, wherein the UPF is associated with at least one tunnel of the existing PDU session of the first UE.

* * * * *